(12) United States Patent
Fluhler

(10) Patent No.: US 11,779,985 B1
(45) Date of Patent: Oct. 10, 2023

(54) FABRICATING METHOD FOR LOW COST LIQUID FUELED ROCKET ENGINES

(71) Applicant: Herbert U. Fluhler, Huntsville, AL (US)

(72) Inventor: Herbert U. Fluhler, Huntsville, AL (US)

( * ) Notice: Subject to any disclaimer, the term of this patent is extended or adjusted under 35 U.S.C. 154(b) by 17 days.

(21) Appl. No.: 17/526,362

(22) Filed: Nov. 15, 2021

Related U.S. Application Data

(60) Provisional application No. 63/113,954, filed on Nov. 15, 2020.

(51) Int. Cl.
| | | |
|---|---|---|
| *B21D 19/04* | (2006.01) | |
| *F02K 9/62* | (2006.01) | |
| *F02K 9/52* | (2006.01) | |
| *B21D 53/84* | (2006.01) | |

(52) U.S. Cl.
CPC ........... *B21D 19/046* (2013.01); *B21D 53/84* (2013.01); *F02K 9/52* (2013.01); *F02K 9/62* (2013.01)

(58) Field of Classification Search
None
See application file for complete search history.

(56) References Cited

U.S. PATENT DOCUMENTS

| | | | | |
|---|---|---|---|---|
| 2,699,036 A | * | 1/1955 | Nicholson | F02K 9/974 110/313 |
| 3,230,613 A | * | 1/1966 | Rechin | F02K 9/972 72/370.11 |
| 5,613,299 A | * | 3/1997 | Ring | B23P 15/008 29/523 |
| 6,205,661 B1 | * | 3/2001 | Ring | F02K 9/62 29/523 |
| 6,381,949 B1 | * | 5/2002 | Kreiner | F02K 9/62 29/890.01 |
| 9,789,556 B2 | * | 10/2017 | Bienvenu | B23K 1/008 |
| 2008/0178650 A1 | * | 7/2008 | Tomizawa | B21D 26/047 72/370.22 |
| 2011/0192137 A1 | * | 8/2011 | Maeding | B23P 15/008 29/890.01 |
| 2015/0090774 A1 | * | 4/2015 | Nishikawa | B23K 1/20 228/253 |
| 2015/0136841 A1 | * | 5/2015 | Bienvenu | B23K 1/0008 228/173.6 |

FOREIGN PATENT DOCUMENTS

| | | | | |
|---|---|---|---|---|
| CN | 106001554 A | * | 10/2016 | ............ B21D 22/14 |
| CN | 209886483 U | * | 1/2020 | |
| CN | 111997785 A | * | 11/2020 | |
| CN | 114160651 A | * | 3/2022 | |
| EP | 0413983 A1 | * | 2/1991 | |
| GB | 749231 A | * | 5/1956 | |

\* cited by examiner

*Primary Examiner* — Jacob J Cigna

(74) *Attorney, Agent, or Firm* — Parent Grove AB; Tomas Friend

(57) ABSTRACT

A method for manufacturing a liquid fueled rocket engine involves forming a first flange in apposition to a top end of a first tube, fixing an injector head to the first flange to form an inner shell liner assembly, shaping the inner shell liner assembly, forming a second flange in apposition to a top end of a second tube, positioning the inner shell assembly inside the second flanged tube and fixing the second flange to the injector head. Rocket engines manufactured using the method have performance superior to existing rocket engines in at least one parameter.

11 Claims, 21 Drawing Sheets

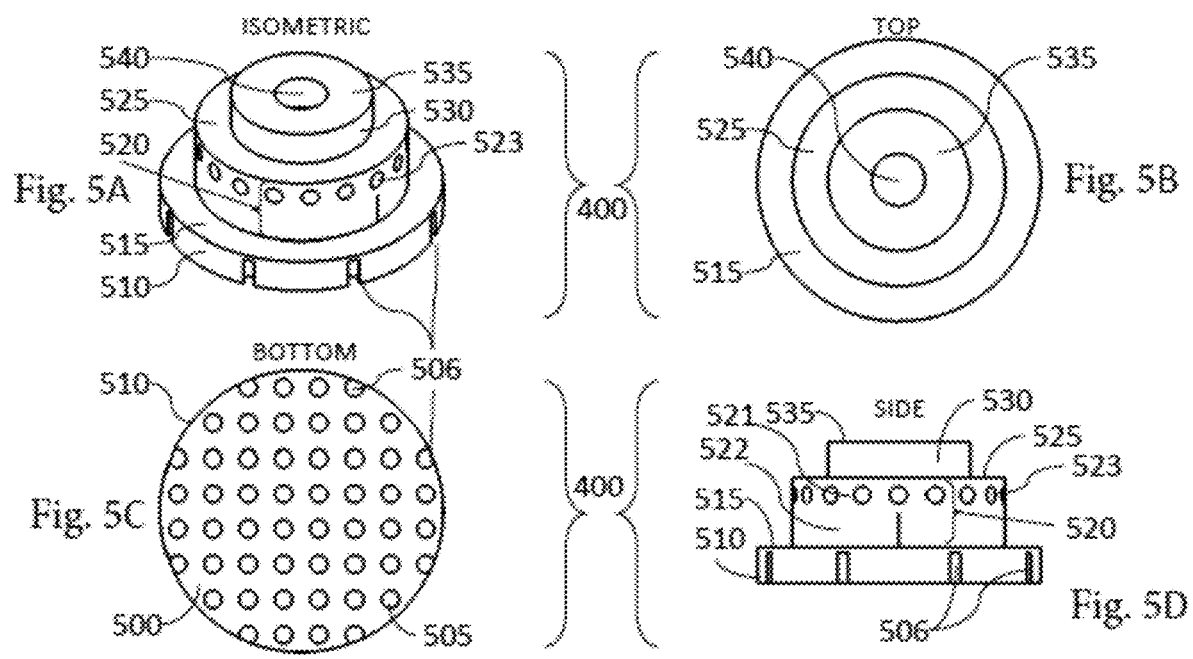
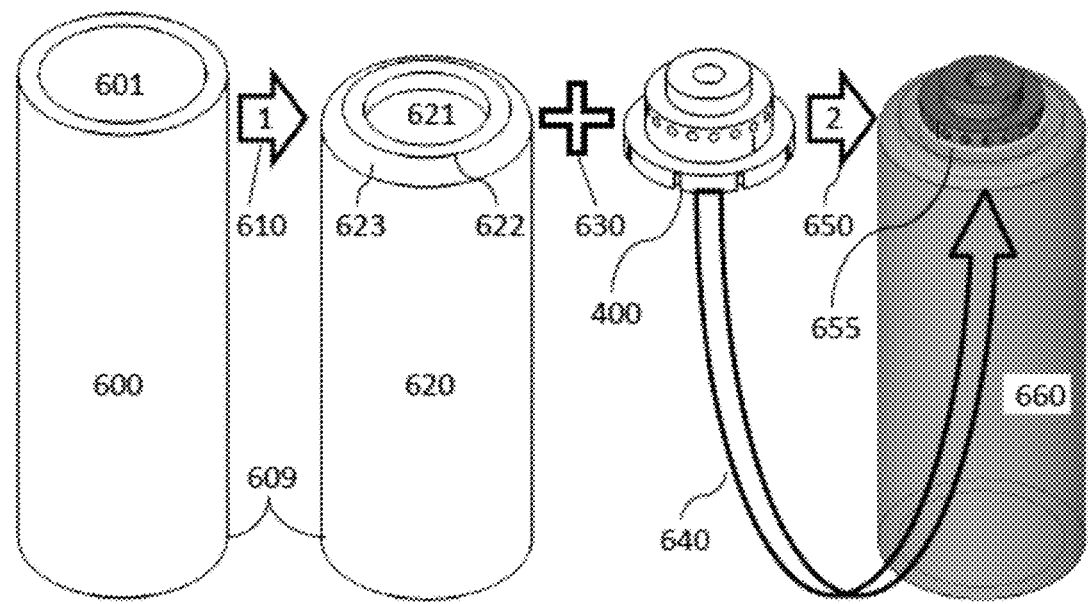
Fig. 6

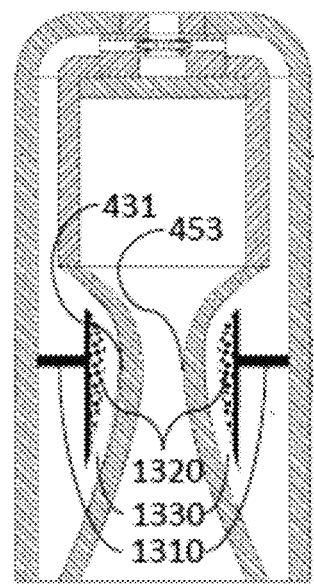 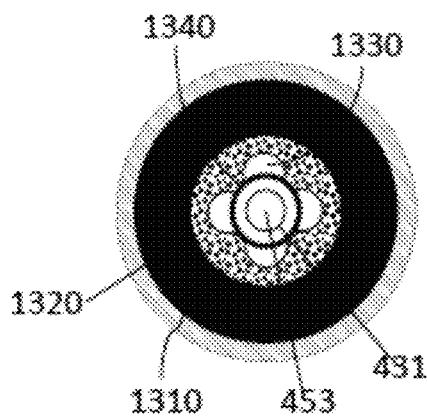
Fig. 13A  Fig. 13B
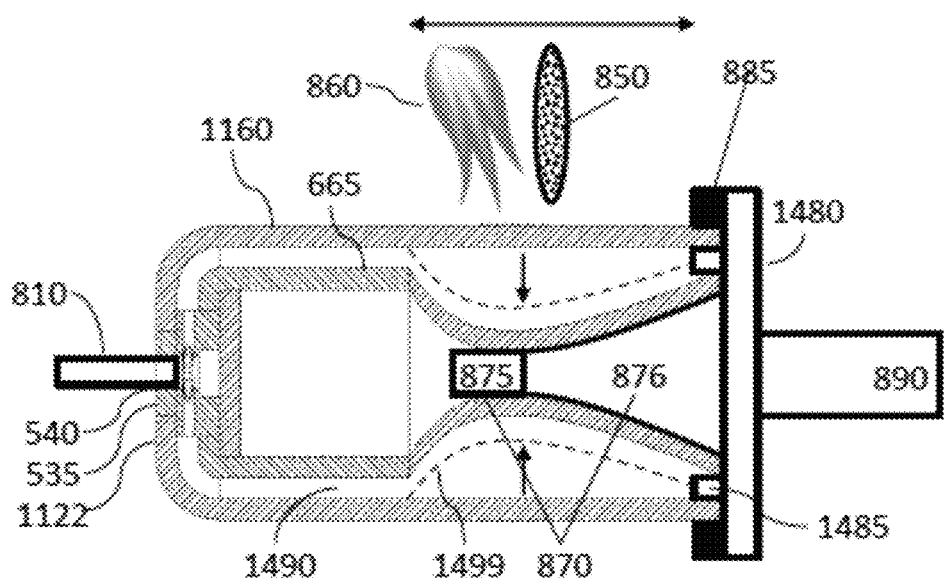
Fig. 14

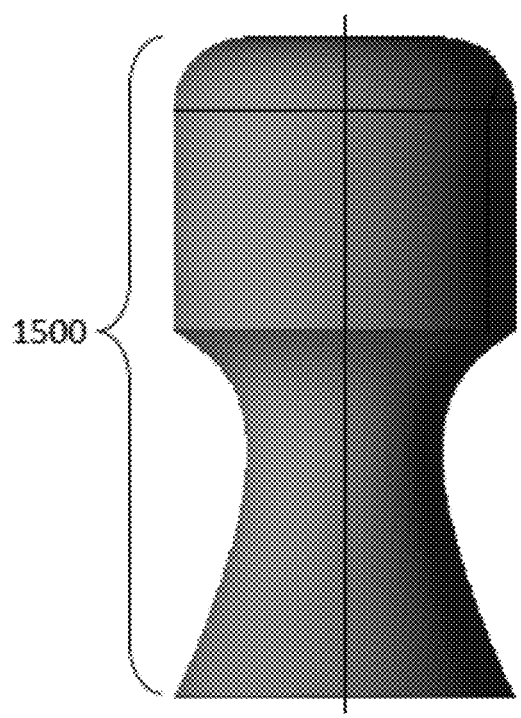
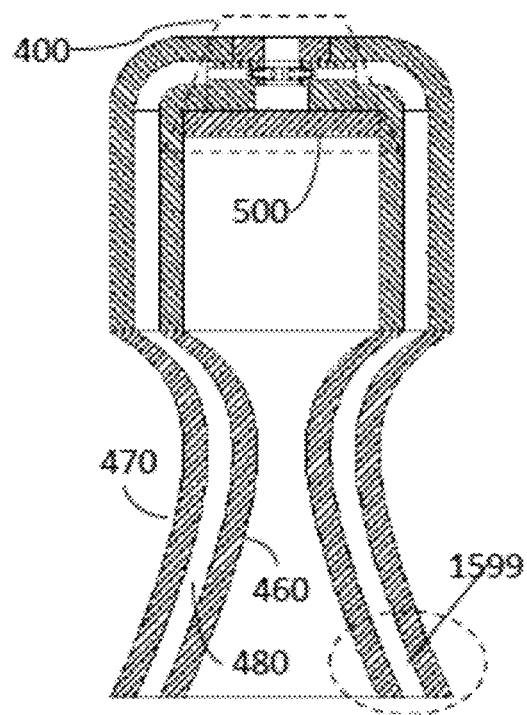
Fig. 15A
Fig. 15B
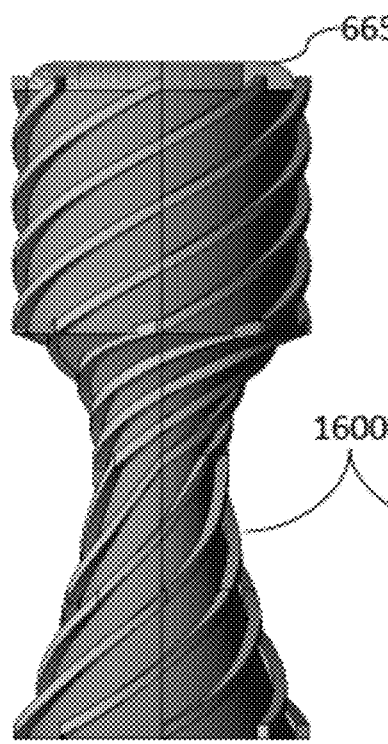
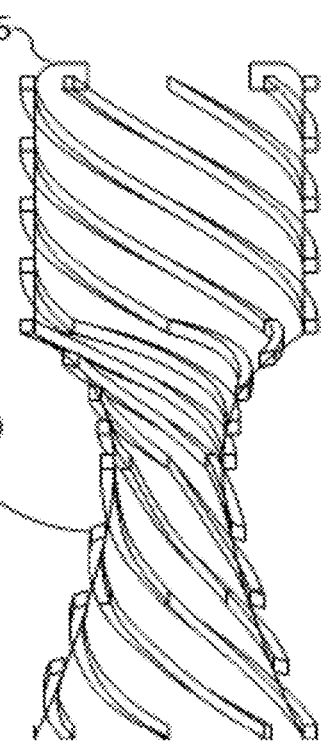
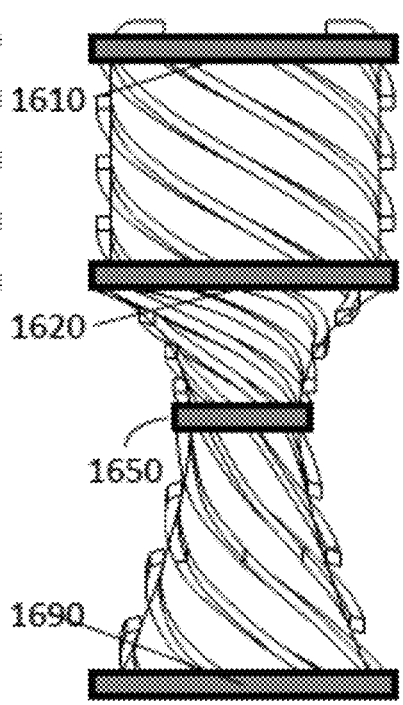
Fig. 16A
Fig. 16B
Fig. 16C

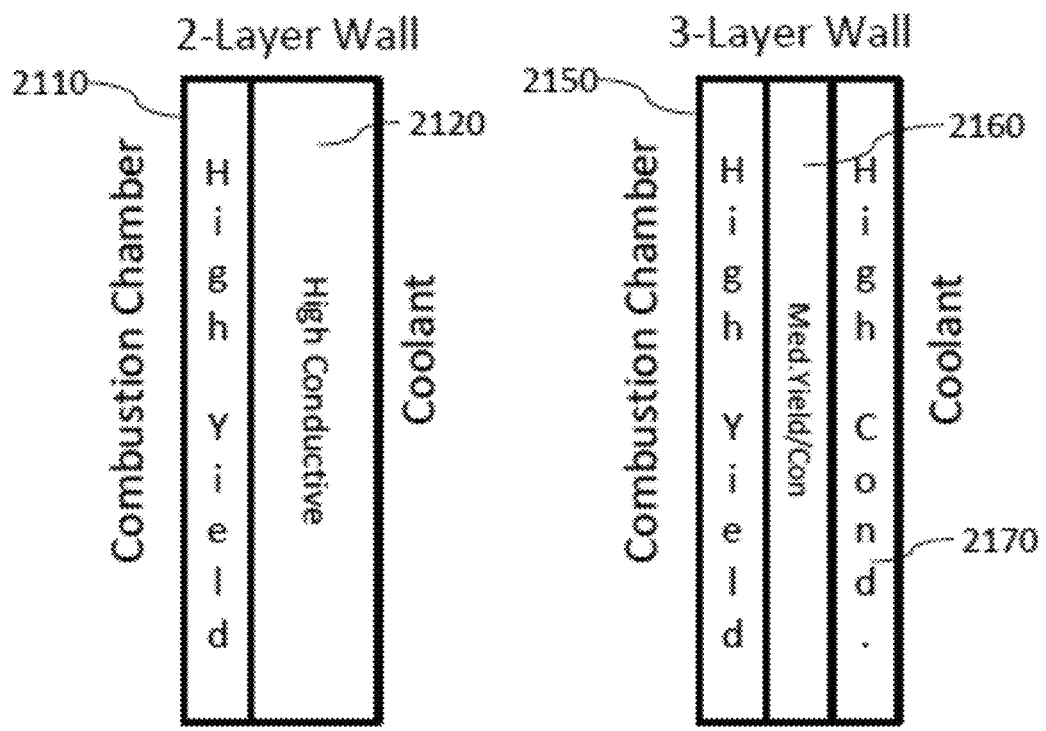
Fig. 20A
Fig. 20B
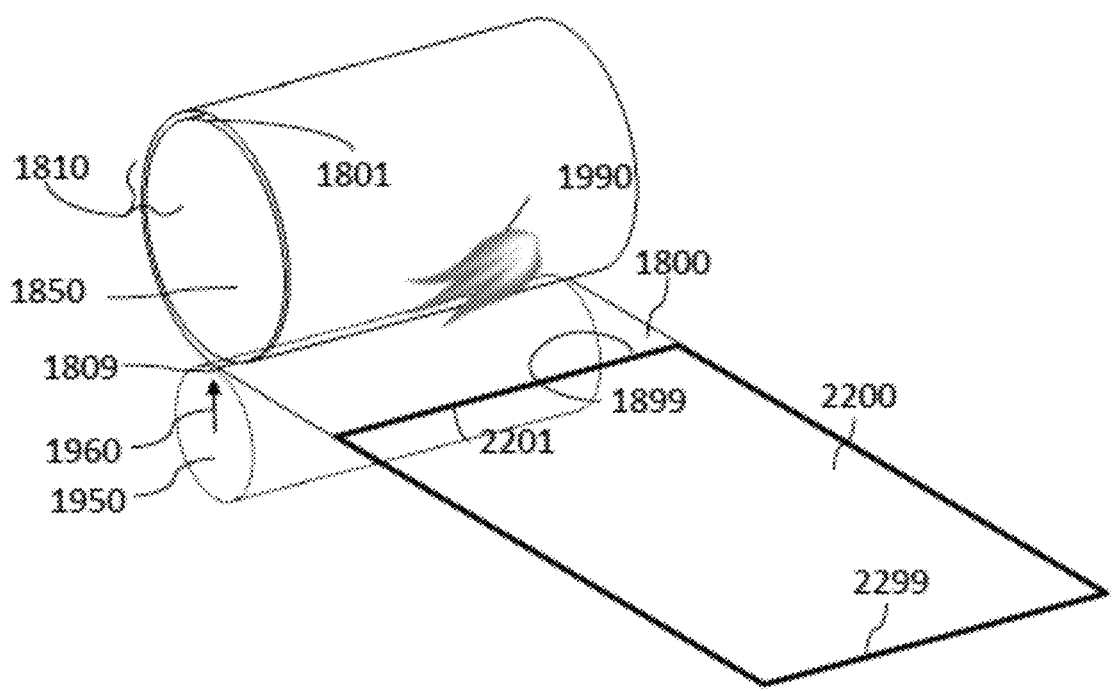
Fig. 21

FABRICATING METHOD FOR LOW COST LIQUID FUELED ROCKET ENGINES

CROSS REFERENCE TO RELATED APPLICATIONS

This application is the original submission.

STATEMENT REGARDING FEDERALLY FUNDED DEVELOPMENT

This invention was not made in whole or in part with any Federal or State government support.

FIELD OF THE INVENTION

The field of this invention concerns the design and fabrication of low cost pragmatic liquid fueled rocket engines. The disclosed design and associated low cost manufacturing method provide for a significant improvement in the affordability of launching rocket payloads and making high altitudes and space more accessible.

BACKGROUND OF THE INVENTION

Liquid propellant rocket engines have generally provided the best means for boosting payloads into the atmosphere and space, including manned spacecraft. They provide a variety of advantages over solid propellant rocket engines to include higher Specific Impulse (Isp), higher thrust to weight ratio, throttlability, and restartability. Performance has continually improved since the first V-2 rocket engine on many fronts, including materials, manufacturing and cycle design.

Arguably one of the highest performance rocket engine in recent years is the RS-25 used to power the U.S. Space Shuttle and, with modification, planned for use in NASA's Space Launch System (SLS). The RS-25 achieves its high performance by the use of Liquid Oxygen (LOX) for the oxidizer and Liquid Hydrogen (LH2) for the fuel which provide a best theoretical Isp, in combination with a dual pre-burner full-flow staged combustion cycle (FFSCC). The FFSCC utilizes all the fuel and oxidizer to power the turbo pumps and to provide efficient thrust, unlike other cycles which can waste at least some of either the fuel or the oxidizer. This system also can achieve some of the highest chamber pressures and highest reliability despite its complexity.

Despite these performance advantages, the FFSCC still has some limitations related to complexity and cost. High complexity is associated with a higher number and frequency of maintenance and refurbishment checks and associated costs to turn such an engine around. Additionally, although it is the most efficient current design because of the closed cycle approach, it still limits the head pressure to the combustion chamber which in turn limits maximum thrust, thrust to weight ratio, and efficiency due to the maximum heating and pumping power capacity of the preburners and associated expansion turbines. Essentially, these are small rocket-jet turbines that power the fuel and oxidizer compression turbines that, in turn, feed the combustion chamber. Controlling the engine requires fine control of these preburners in such a manner that they do not overheat and wear destructively, which has the potential to cause complete failure. Conversely, their maximum pumping throughput and associated head pressure is limited by the temperatures that the expansion turbines can withstand without damage. This limits the head pressure of the combustion chamber which, in turn, limits the thrust that can be produced.

These and other factors add up to significant costs for launching rockets with this type of engine and similar engines. One way to lower costs is to reduce the cost per launch (or cost per mission) and another is to reduce the cost per pound of payload. The former is most important when the mission can only be achieved by one of the fewer heavy lift boosters. The latter is most important when the mission only requires a small payload, such as for inserting microsatellites into orbit or for small sub-orbital trans-atmospheric experiments, or possibly very small exo-orbital science payloads.

Between ½-⅔ of the cost of a rocket is attributable to the rocket engine. Accordingly, anything which can reduce rocket engine manufacturing cost will reduce the cost of the rocket appreciably, and thereby reduce the cost of both a flight and the per pound cost. Although the cost per launch and cost per pound have been reduced over time, they are still very high by non-aeronautical standards.

Fabrication methods for Rocket Engine are known from U.S. Pat. Nos. 5,249,357; 9,835,114; 10,471,542; US 2019/0329355A1; US2019/0331058A1; U.S. Pat. Nos. 9,835,114; 10,471,542; and WO 2000/020749A1. Current methods typically involve a solid cylindrical or thick tubular blank of copper alloy that is cast and then machined with standard methods into a rocket engine having desired outer and inner profiles. A set of collinear, axially aligned channel grooves is machined into the outer surface of the alloy along a substantial portion of the entire axial length of the bell from the top near the injector head to the bottom at the exhaust exit port. The resulting body constitutes a mandrel around which a tight spiral of tightly spaced wire is circumferentially wound and laser sintered, resulting in dual liner rocket engine with embedded axially disposed cooling channels around a subsequently exposed inner surface of the rocket engine.

Disadvantages of current methods include the expense and waste involved in the milling a large solid casting of a metal alloy and the costs associated with precision milling, including milling of cooling channels or warping precision longitudinal ridges into the inner shell liner, and applying the outer shell to a highly curvilinear contour of the inner shell so as to be hydrostatically closed and robust to leakage at high temperature and pressure gradients across it as well as a harsh vibration environment. Additionally, structurally integrating and sealing the injector head and coolant feed and exit manifolds introduces complexity and weight.

BRIEF SUMMARY OF THE INVENTION

The present invention seeks to mitigate and/or eliminate the above disadvantages and/or limitations, alone or in any combination, by simplifying liquid rocket engine design and fabrication methods. Although applicable to all liquid fueled rocket engines, the invention is particularly suitable to smaller and medium sized engines.

A first objective of the invention is to provide a method of manufacture for rocket engines that is significantly simpler and thereby less expensive than existing methods.

Another objective of the invention is to provide a method of manufacture for rocket engines that produces rocket engines having performance superior existing rocket engines in at least one parameter such as thrust to mass ratio (thrust to weight ratio), for example by producing rocket engines having a lower weight than existing methods.

Yet another objective of the invention is to provide a rocket engine made according to the described method.

The method can be employed in the construction of liquid fueled rocket engines, including hybrid rocket engines, and is particularly useful for making mono propellant and bi-propellant liquid propellant rocket engines, and especially liquid cooled rocket engines.

The method involves computer numerical controlled (CNC) spin forming of a sheet or tube of a first metal alloy into a first domed metal alloy tube, leaving an injector head opening in the dome of the first tube for acceptance of an injector head. An injector head comprising a first flange is inserted and mounted inside and affixed to the injector head opening in the first dome, thereby closing out the top part of the combustion chamber from the inside. The Injector head is designed to provide the mounting flange and to have a centerline external mounting point for mounting the entire assembly into the spin forming machine after the Injector head has been affixed to the opening of the first domed tube. The first domed metal alloy tube with the injector assembly is then remounted into the spin forming machine, and the nozzle and bell of the rocket are spin formed using the CNC spin forming machine to form a complete inner shell liner surface of the rocket engine with the injector head installed.

A second domed metal alloy tube is made using the same CNC spin forming techniques. The second domed metal alloy tube has an opening for mounting to a second, outwardly disposed flange on the injector head and is affixed to the injector head by mounting onto the second outwardly disposed flange. The second domed metal alloy tube serves as the outer lining of the rocket engine. The inner lining and outer lining may be fixed to the injector head by some combination of fasteners, seals, and/or welds to ensure strong attachment and eliminate any chance of leakage.

The inner and outer liners are concentric with, and mounted to, the injector head. The assembly is mounted to the CNC spin forming machine, with the spin former providing a supportive mandrel for the tail spindle for both the inner and outer liners. The outer liner is spin formed to provide the desired contour generally following parallel to the nozzle shape of the inner shell liner. This leaves a gap between the inner and outer shell liners for propellant to flow to cool the engine and, in particular, the inner shell liner. This gap may be made larger or smaller at most any axial station through the chosen spin forming profile.

An end cap coolant plenum ring is affixed to the end bell lip of the liners which normally end together at the end of the bell. This manifold ring structurally secures the two liners together, enforces a desired separation distance between the liners and provides propellant inlets to the volume between the liners for cooling.

BRIEF DESCRIPTION OF THE DRAWINGS

The elements of the drawings are not necessarily to scale relative to each other, usually in order to enhance clarity, with emphasis placed instead upon clearly illustrating the principles of the disclosure. Like reference numerals designate corresponding parts throughout the several views of the drawings in which:

FIGS. 5A-D are isometric, top, bottom, and side views of an injector head assembly for optional be mated with an inner shell liner and an outer shell liner;

FIG. 6 shows a sequence of steps for assembling an inner shell liner assembly comprising an injector head assembly;

FIGS. 13A and 13B are side and top cross-sectional views of a collar and baffle inserted into a coolant plenum between inner and outer shell liners;

FIG. 14 is a side cross-sectional view of spin forming a nozzle shaped outer shell liner with nozzle shaped coolant plenum;

FIGS. 15A and 15B are side and side cross-sectional views of an embodiment of a low cost liquid fueled rocket engine fabricated according to the described method;

FIGS. 16A-C are side views of metal structures applied to the surface of an inner shell liner in a vortex spiral style geometry;

FIGS. 20A and 20B illustrate alternative material layer configurations for countering thermal induced fatigue;

FIG. 21 illustrates rolling multiple layers of sequentially different materials into a desired tube/pipe;

FIG. 24B shows two exemplary screen sheets with rectangular apertures perpendicularly disposed to each other laid up with enclosing upper and lower solid sheets to create a labyrinth of coolant flow channels;

DETAILED DESCRIPTION OF THE INVENTION

The invention is described using described embodiments as non-limiting examples. The invention may take the form of different embodiments to accommodate specific details in the requirements and design of a given rocket engine including different thermal cycles, different operating regimes, and different fuels, for example.

Figure 1:
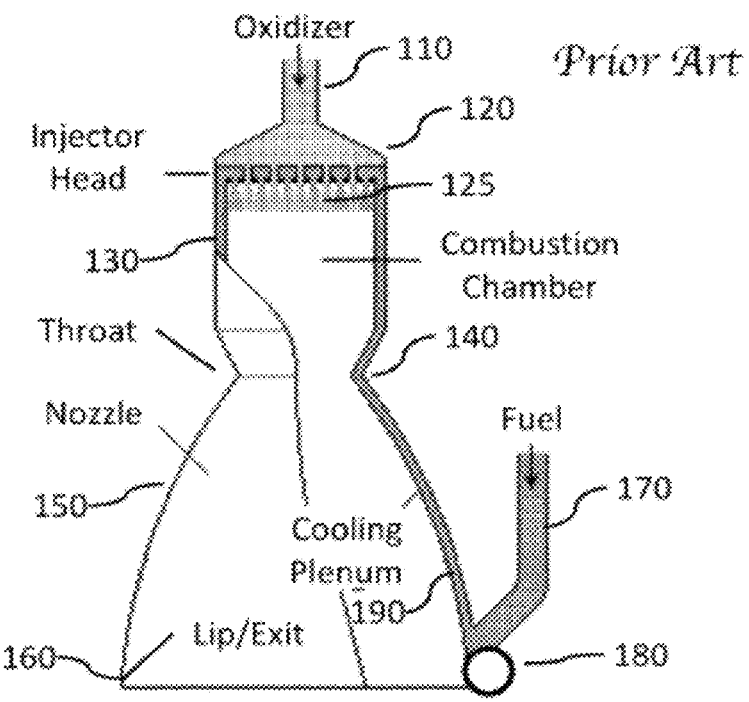
FIG. 1 is a side cutaway view showing the main components of a prior art regeneratively cooled liquid rocket engine.

FIG. 1 shows primary components of a conventional liquid rocket engine. Almost all liquid rocket engines comprise at least an injector head 120, a combustion chamber 130, a nozzle 150, a throat 140, and a bell 160 extending down to the lip or exit. At least one propellant input 110 feed into the injector head 120 directly or via an alternate input 170 into the coolant manifold 180 that feeds the coolant plenum used to cool the engine from the heat generated in the combustion chamber 130. If the propellant is a bi-propellant, then the oxidizer is usually input near the top if the engine into the injector head 120, and the fuel is input into the coolant manifold 180 to be distributed evenly into the coolant plenum 190 before flowing into the injector head 120 to be injected with the oxidizer via a fine atomized spray 125 into the combustion chamber 130. Variations on this core design include different thermodynamic cycles, variations on the plumbing and even reversals of the roles of fuel and oxidizer.

Figures 2A, 2B:
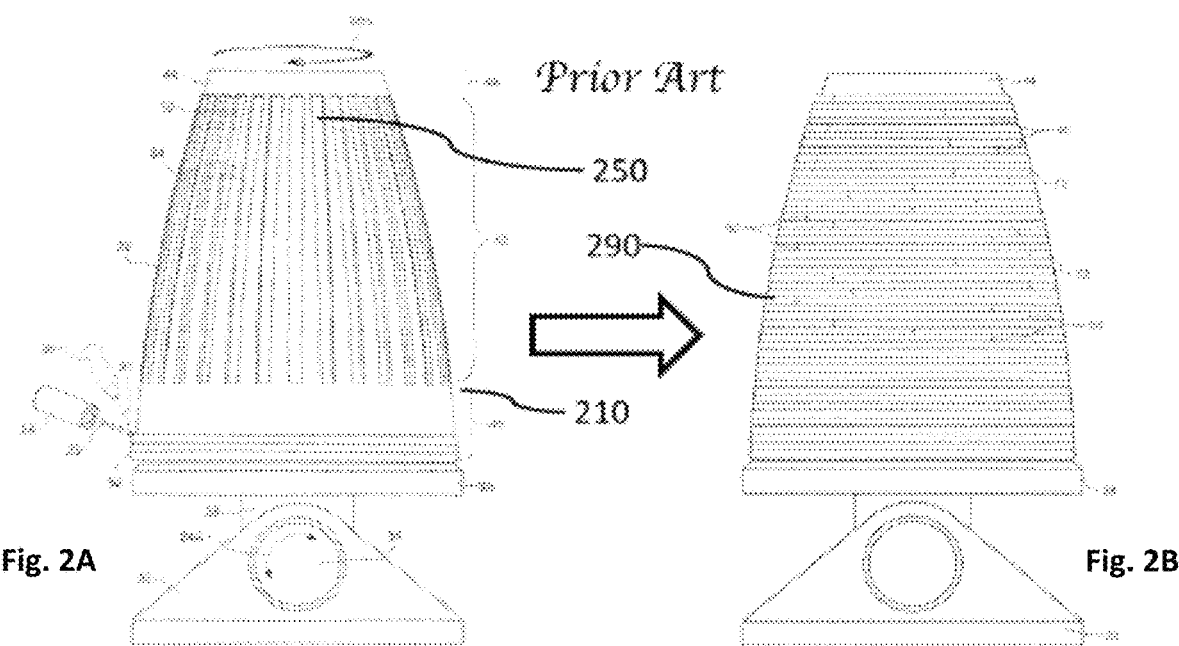
FIGS. 2A and 2B are side views of a prior art fabrication technique for a regenerative cooled liquid rocket engine.
Figures 3A, 3B:
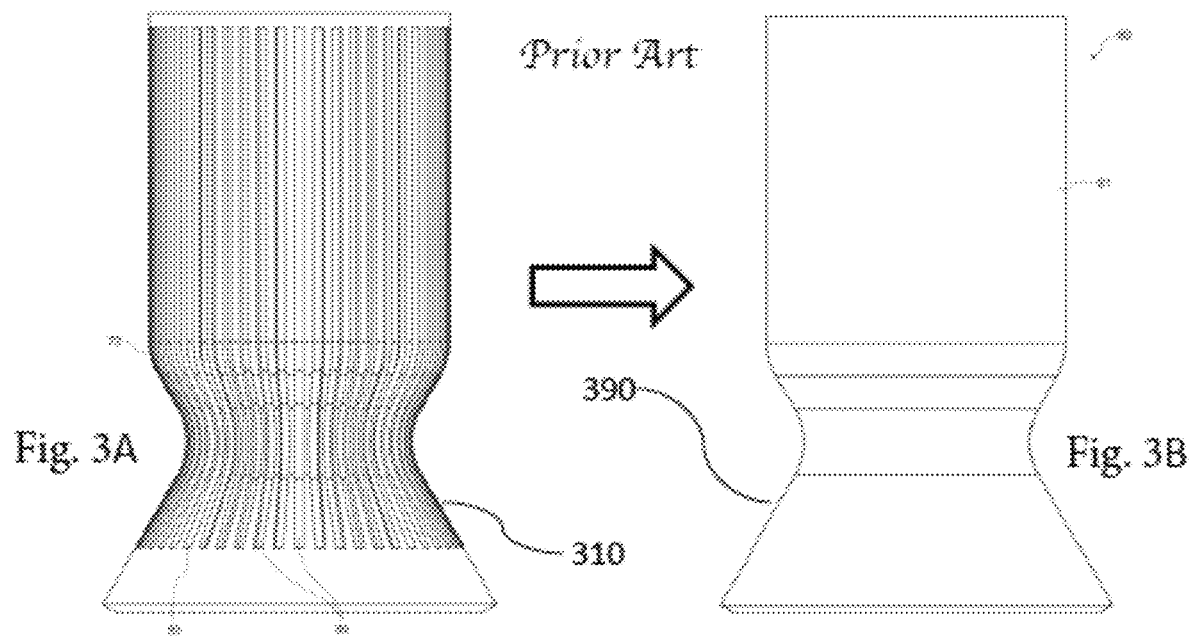
FIGS. 3A and 3B are side views of an alternate prior art fabrication technique for a regenerative cooled liquid rocket engine.

FIGS. 2A and 2B show a representative state of the art method for rocket engine fabrication as disclosed in U.S. Pat. No. 10,471,542. The figures are provided to more fully describe differences between methods of making rocket engines using terminology consistent with the presently described method. A copper alloy inner shell liner 210 with vertical cooling channel groves 250 cut into it is initially cast as either a solid block or a thick tube and then precision milled to the shown conical nozzle shape (FIG. 2A). This is followed by precision milling of the axially aligned cooling channel grooves 250 into its outer face. The resulting assembly comprises the inner shell liner of the combustion chamber from the throat to the end of the nozzle, prior to application of the outer shell liner. FIG. 2B shows the final assembly 290 after the outer shell liner is applied to the exterior of the inner shell liner 210. The outer shell liner closes out the axially aligned cooling channel grooves cut into the inner shell liner along the perimeter of the outer side of the inner shell liner. The outer shell liner can potentially be of the same alloy as the inner shell liner but is usually made with a less thermally conductive but physically stronger material such as stainless steel, Nickel or Iconel which is brazed or welded to the ribs between the cooling channel grooves. Alternatively, this step can be replaced by winding a wire of the desired outer shell metal around in a tight single wrap spiral spool, all the while using a laser to weld it to the ridges between the cooling channel grooves, and to each adjacent wire, thereby constructing, one wrap at a time, a closed shell about the inner shell liner. FIG. 3 shows an alternate embodiment with the inner shell liner 310 and the outer shell liner applied in 390.

The disadvantages of current build processes include the expense and waste involved in the milling a large solid casting of a metal alloy and the costs associated with precision milling, including milling of cooling channels or wrapping precision longitudinal ridges into the inner shell liner, and applying the outer shell to a highly curvilinear contour of the inner shell so as to be hydrostatically closed and robust to leakage at high temperature and pressure gradients across it as well as a harsh vibration environment. Additionally, structurally integrating and sealing the injector head and coolant feed and exit manifolds introduces a complexity and weight penalty when compared to the present method. The present method mitigates or eliminates these disadvantages.

Figures 4A, 4B:
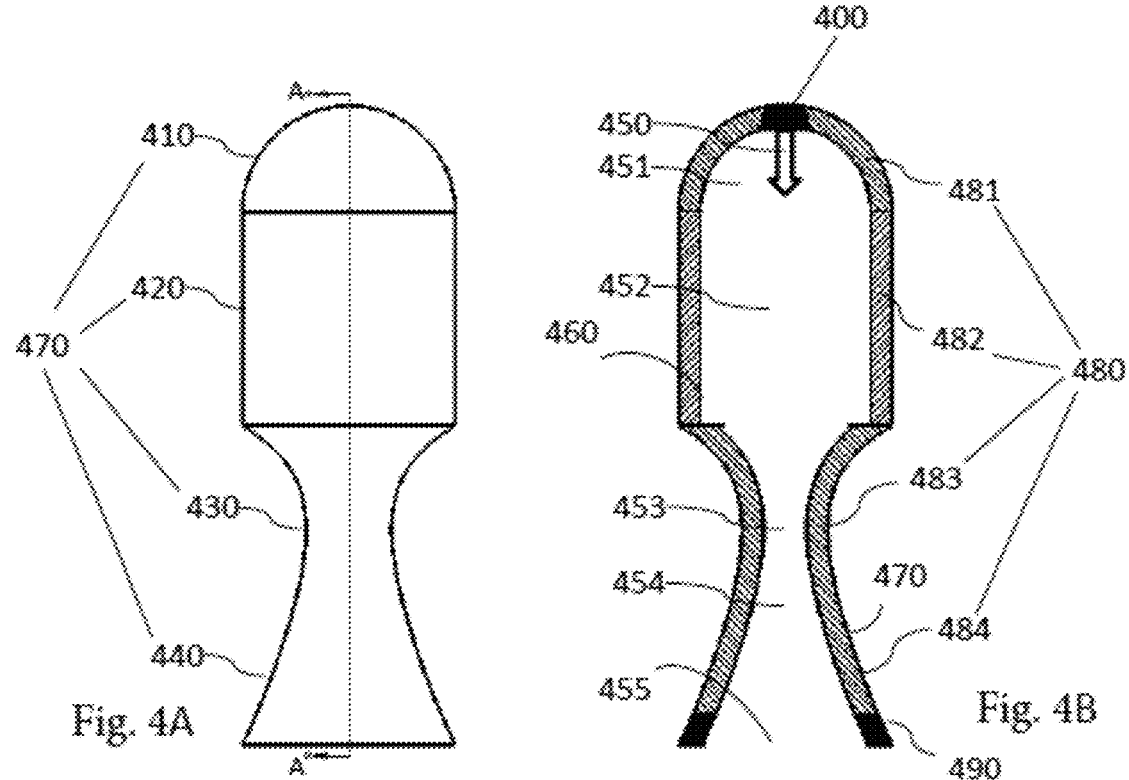
FIGS. 4A and 4B are side and cross-sectional views of one embodiment of a low cost liquid fueled rocket engine.

FIGS. 4A and 4B show a simple embodiment of a liquid fueled rocket engine made using a method of the invention. The rocket engine comprises a head section 410, a combustion chamber body or section 420, a nozzle throat section 430 and a nozzle bell or skirt section 440 which, together comprise the outer shell liner 470 of the rocket engine (FIG. 4A). FIG. 4B is a cross section through the central longitudinal axis labeled "A" to show a singular inner shell liner 460, a singular outer shell liner 470, an injector head 400 registering, securing, fixating to and supporting the inner shell liner 460 to the outer shell liner 470. The inner shell liner 460 may be made of a suitable metal alloy used for rocket engine fabrication. In preferred embodiments, the inner shell liner 460 comprises a copper alloy. The outer shell liner 470 may be made of a suitable metal alloy used for rocket engine fabrication. In preferred embodiments, the outer shell liner 470 comprises a stainless steel alloy.

A bottom termination ring 490 closed with welds/brazing and/or fasteners seals is used to secure and fixate the inner shell liner 460 to the outer shell liner 470 along the circumference of the bottom nozzle bell exit aperture edge and exit 455. The bottom termination ring 490 may comprise or be accompanied by a coolant manifold ring that may be fabricated a number of different ways, as long as it closes the gap between the two shell liners at the nozzle exit and also allows the admittance or removal of coolant to the volume of the coolant plenum near the exit 455. The bottom termination ring need not be the terminal axial extent of the finished rocket engine ready for firing, as an additional nozzle bell extension may be added to it as a mounting point to achieve a desired area ratio between the throat cross sectional area and the terminal exit area with the nozzle bell extension to optimize performance. However, the exit 455 is typically the lowest axial extent of any liquid cooling.

The components provide a completely enclosed pressurized annular shell shaped coolant plenum 480 comprising subordinate cooling plenum volumes shown as the head coolant plenum 481, the combustion chamber body coolant plenum 482, the throat coolant plenum 483 and the nozzle coolant plenum 484. Although identified individually above, all of the subordinate coolant plenums usually comprise one substantially continuous coolant plenum 480 distributed across the cooling plenum volumes 481, 482, 483, and 484, although segmentation into two or more separate coolant plenums may be advantageous for certain designs.

The two concentric and coaxial shells, the inner shell liner 460 and the outer shell liner 470, are shaped substantially into a De Laval nozzle contour or its close approximation the Rao nozzle. This shape modulates the velocity of the flow such that propellant injected 450 from the injector head 400 has heat added to it in the head volume circa 451, either by chemical reaction or other means, then expands into the combustion chamber 452 where combustion is completed and/or heat addition is completed ensuring a gaseous flow, followed by gas acceleration to the mach disk in the throat at 453, followed by further gas acceleration to supersonic speeds in the nozzle 454 and finally exiting the nozzle at the nozzle exit, or lip 455, with an ideally expanded supersonic gas stream that provides maximum performance.

According to one embodiment of a manufacturing method of a rocket engine, the inner and outer shell liners 460, 470 are different individual parts that may be secured via welds, but alternatively by seals and fasteners, or a combination thereof, to their own separate annular flanges built into the injector head 400. In FIG. 4, the injector head is not drawn to scale for clarity. In a preferred embodiment the injector head 400 occupies a substantial fraction of the diameter of the head section 410 to take the majority of the radial and longitudinal stresses seen in the rocket head 410, thereby affording weight savings versus heavier embodiments using mating flanges and fasteners at the joint between the head 410 and the combustion chamber body 420.

FIGS. 5A-D show a preferred embodiment of an injector head 400 and its fastening features for mounting to the inner and outer shell liners. The injector head acts as one of two core structural components in the rocket engine to hold the whole engine together. The injector head 400 provides primary mounting points for attaching the engine to the rocket and or associated gimbaling. Since the injector head 400 is usually a substantial structural component of a rocket engine, this dual functionality does not incur a significant additional weight or cost penalty.

Variations to this design are possible but the core attribute of the injector head 400 is the feature of providing a mechanical means for mounting, spacing (gapping) and securing the inner shell liner to the outer shell liner together and into an engine on the top end, while providing for the requisite coolant plenum needed to cool the engine during operation. The bottom terminal ends of the inner and outer shell liners near the nozzle end 455 are likewise mounted, spaced and secured through the use of a termination ring 490. In this way, the engine is assembled, held together and mounted ideally by only these two points, thereby simplifying construction and cost while still providing sufficient strength for good performance.

In FIG. 5, the injector head assembly 400 comprises a lower/inner largest diameter first flat cylinder/disk 510, upon which is formed a taller in height mid-sized diameter second cylinder/disk 520 in the outward direction from the combustion chamber. Upon cylinder/disk 520 is formed a subsequent third outer-most, smallest diameter cylinder/disk 530 further in the outward direction from the combustion chamber from cylinder/disk 520. The injector head assembly 400 thereby comprises the stacked assembly of cylinders/disks 510, 520, and 530.

The first cylinder/disk 510 has a first largest diameter upper/outer side flange surface 515 which faces and mates to the inner surface of the inner shell liner 460. After assembly, the two are fixed together by welding, brazing, fasteners, or a combination thereof. The second cylinder/disk 520 likewise has a second largest diameter upper/outer side flange surface 525 which faces and mates to the inner surface of the outer shell liner 470. After assembly, the two are fixed together by welding, brazing or fasteners, or a combination thereof. In this way, the hole in the top of each shell liner provides a flush annular inward bent corner flange that mates to a corresponding injector head annular flange top surface, such that they can be welded or fixated together with suitable seals. A centering lip may also be provided on each flange of the injector head to aid in robustly centering the injector head to the longitudinal axis of the shell liners. Through the two joining operations between flanges on the inner and outer shell liners and corresponding mating flanges on the injector head assembly, the injector head 400, the inner shell liner 460 and outer shell liner 470 are assembled and fixated together into a superior assemblage.

The engine can accommodate either monopropellant or bipropellant with suitable changes for each. Assuming a bipropellant rocket, there will be a fuel and an oxidizer. Although different rocket engine designs purpose the fuel and oxidizer routing in the engine for different other reasons, a most common approach is to use the fuel for the coolant in the engine, which will be used herein to illustrate the construction method and operation of the invention. However, it should be obvious to those skilled in the art that modifications of the invention enable the roles of the oxidizer and fuel to be reversed, altered, or in the case of monopropellants, some elements are even eliminated.

The injector head 400 further comprises a pipe connection and manifold entrance 540 for attaching to propellant supplies and distributing the propellant 450 in the combustion chamber 451, usually via an exothermic reaction at 452, but possibly via a source such as a nuclear reactor. In a preferred embodiment, a bi-propellant is used such as RP-1 (fuel) and LOX (oxidizer) or methane (fuel) and LOX (MLOX). The fuel is used to cool the engine and is injected into the coolant plenum 480 either near the throat 483 or near the nozzle exit 484. The coolant is variously distributed in different directions in different rocket engine designs depending, among other factors, on the cycle used. Generally, at least some of the fuel is pumped by the turbines from the aft of the engine towards the head of the engine because the highest heating load on the engine walls is around the combustion chamber 452 and, in particular the throat 453, which can receive in excess of twice the heating load of the rest of the engine.

The second cylinder/disk portion 520 of the injector head 400 is normally taller than the other cylinder portions of the injector head in order to accommodate the thickness of the inner shell liner 460 and also the gap between the inner shell liner 460 and the outer shell liner 470 for the coolant plenum 480. The second cylinder portion 520 of the injector head 400 may further comprise a lower/inner part 521 and an upper/outer part 522. The lower/inner part 521 abuts to and is covered over by the inner edge of the inward bend flange of the inner shell liner 460. The edge of the flange of the inner shell liner 460 is also welded to the injector head circumference in the area of 521. The upper/outer part 522 resides at the same plane as the coolant plenum 481 and integrates with coolant channels whose opening ports are illustrated as a multiplicity of apertures 523 around the entire circumference of the second cylindrical section 522 of the injector head. These ports admit or remove coolant that flows between the top side of coolant plenum 481, between the inner and outer shell liners, allowing for coolant flow over the whole of the engine between under pressure sufficient for their routing through injector galleys internal to the injector head (not shown), which then is eventually ejected as propellant from injector ports 505 and 506 on injector face 500 and film cooling injectors 510.

The injector ports 505 reside on the bottom side 500 of the first cylinder section 510 of the injector head facing the mixing area 451 and combustion chamber 452. Although shown flat, this bottom side surface could be flat, curved concave or curved convex or have most any axial and azimuthal profile desired in accordance with other requirements of the design such as ensuring good propellant combustion without instabilities or acoustic resonances. For example, a certain axial and azimuthal profile of "hills and valleys" or of a variety of crossed wedges or walls protruding into the combustion chamber may be desired, and are supportable by the fabrication of same to the bottom side face 500 to, for example, dampen acoustic waves and resonances in the combustion chamber.

Injectors 505 may be selected from any number of a large variety of alternatives to include pintle injectors, swirl injectors, dual or twin injectors or triple injectors as well as others. Injectors 505 may also be injectors for a single mono-propellant, for example Hydrogen Peroxide, or mixing injectors, mixing fuel and oxidizer together before injection into the combustion chamber, or a combination of individual fuel and individual oxidizer injectors distributed in a preferred manner to manage combustion in the chamber, generally with uniform distribution across the face of the injector plane surface 500. The first flange with its first cylinder section 510 allows addition of peripheral injectors 506, which are not always present in rocket engine injector heads, to distribute some propellant, typically fuel, along the outer perimeter of the combustion chamber to provide film cooling.

In a preferred embodiment, only fuel is introduced into the coolant plenum 480, although as mentioned above for other reasons, other embodiments may prefer oxidizer for the coolant or possibly even both (invariably in separated plenums). The oxidizer is introduced into the injection head and into the rocket engine via oxidizer input port 540, which is normally made to mate with a threaded and/or welded oxidizer supply pipe from an oxidizer pump or tank, or secured with a threaded coupler, a flange and seal arrangement, or other similar pipe mating means. The oxidizer flows into the injector head and is distributed through the injector head body to injectors 505. Injectors 505 represent fuel, oxidizer, or mixed fuel and oxidizer injectors.

FIG. 6 shows assembly process for fabricating the inner shell liner 460,620 and integrating it with the injection head 400. The rocket engine can be fabricated from either a disk sheet or a shell tube 600. In the case of the disk sheet, a first spin forming operation would produce a tube with a capping dome. From this point on the operations would be the same as for starting with a tube shell 600 and applying a capping dome. The process begins with a tube of material 600, normally an alloy of copper for its high thermal conductivity and an associated good mechanical strength, for the inner shell liner 460,620. This material should have a high conductivity to wick heat away quickly from the surface of the inside of the combustion chamber and nozzle exposed to the extremely hot gasses of the rocket effluent. Additionally, the material for the inner liner 460,620 should have both a high compressive strength as well as a high tensile strength when subsequently configured in the form of a axially symmetric De Laval nozzle and combustion chamber. Copper and alloys thereof have been found to be particularly good materials for this purpose although Iconel, steel and some alloys of iron and titanium may be used as well.

The fabrication process for the inner liner begins with selecting the tube 600 for the inner shell liner 460,620 of the desired material. The tube is mounted into a spin forming lathe using first forming mandrel. The thickness of the tube must be sufficient to provide the required structural strength after thinning during the spin forming process and the tube must be cut to a preprocess length which compensates for length shrinkage and wastage. This length is longer than the objective rocket engine to accommodate length shrinkage from top flange wastage, top flange spin forming, and later nozzle spin forming and tail end flange wastage and spin forming, as well as for the shrinkage or expansion that may be associated with fitting end mounts for spin forming. The tube 600 has a front open end 601 and a rear open end 609, both of which may be trimmed during the process.

The initial spin forming step 610 proceeds by spin forming an inward directed rounded annular corner 623, also referred to as a blended edge, into front end 601. Tube 600 is mounted in a spin forming lathe with suitable end stock mandrels to support the front end 601 in the chuck, and the back end 609 in the tail stock (or visa versa) of the spin forming lathe (not shown). A rounded blended edge corner 623 and front end flange 622 are spin formed onto the front end 601, decreasing the net length of tube 600. This leaves a circular aperture 621 of the correct diameter to allow injector head 400 to be inserted 640 through the opening at the back end 609 and pass cylinder 520 of injector head 400 through it, but not cylinder 510, whose face 515 will then press flush against the inner side of the flanged tube 620 under flange 622. The flange 622 may be extended further radially inward and then trimmed with a lathe cutting tool or mill to be of the same diameter as 520 with suitable clearance for easy assembly, if required. This diameter may also have allowance for a welding groove to aid in forming an excellent weld between the tube 600 and the injector head 400 in the next step. The product of this fabrication step is a spin formed inner shell liner 620 with a well formed bend 623 and flat flange 622 and a suitable flanged opening 621.

Next, the injector head 400 is inserted 630 in a head up orientation 640 into the base of the inner shell liner 620 and through the flanged opening 621 to seat flange 515 against the bottom/inner side of flange 622. The injector head 400 is thereby held concentrically within the tube 620 by flanged opening 621. The injector head 400 is preferably fixed 650 at the flanged opening 621 by welding to the top inner edge of flange 622. Additionally or alternatively, mechanical fasters along the center of the flange 622 may be secured into the top side flange 515 of the injector head. Seals may also be employed between the flange mating surfaces. This provides mechanical and self sealing attributes by flange 515 being pressed hard against the bottom side of flange 622 by pressure inside the combustion chamber. The result of these processes is an inner shell liner 660 coupled with the injector head 400.

Figure 7:
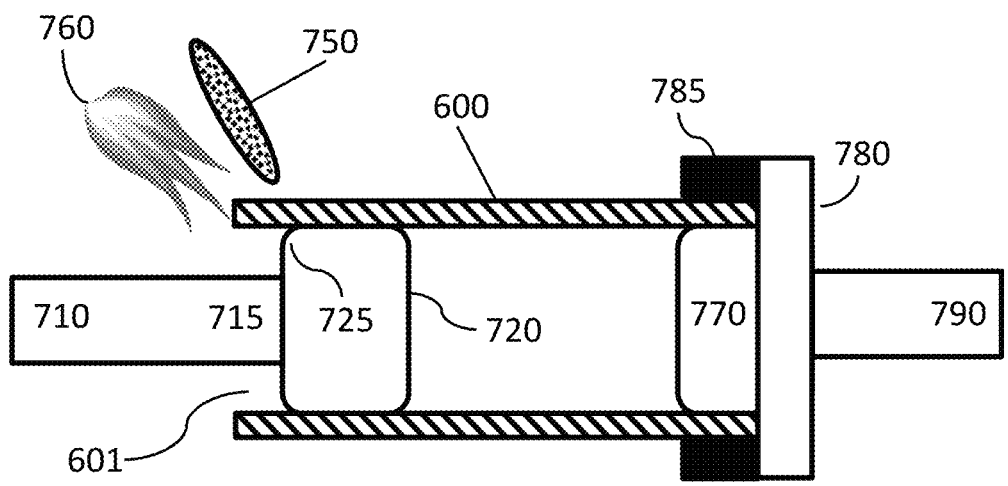
FIG. 7 is a side cross-sectional view of a spin forming step for a top flange end cap.

FIG. 7 illustrates spin forming of the flanged opening 621. A top end mandrel 720 with associated shaft 710 is inserted into the top end of the inner shell liner tube 600 near its top end opening 601. The front mandrel has a rounded enlargement 725 of the same shape desired for the end cap bend 623 of the inner shell liner 660. The shaft 710 has a terminal diameter at 715 in the plane of the top of the objective shell liner that is no larger than flanged opening 621. This mandrel has a mechanical or other means for symmetrically spreading within the top end inside of the tube 600 in order to firmly grip it from movement and to hold it concentric with the shaft 710. The actual shape spun depends on the specific design intended which, instead of a hemisphere could comprise most any other axially symmetric shape to include an inward pointing flange about the top portion of the combustion chamber.

The bottom end 609 is held firmly within a second mandrel 770, also possessing a backing plate 780 and a clamping means 785 which prevent the tube 600 from migrating axially and rotating differently from the mandrels. The backing plate 780 and clamping means 785 also maintain the tube in a position concentric with both the front mandrel 720 and front shaft 710, as well as a rear shaft 790 for the rear mandrel 770. The rear mandrel need only hold the bottom end 609 in a manner to not overtly expand nor contract the opening while firmly holding the tube 600. The front shaft 710 may be held by chuck and the rear shaft 790 may be held by the tail stock of the spin forming lathe, or vice versa. Since the rear mandrel 770 has a positive clamping means 785, it may be preferable to reverse the roles of the shafts such that the front shaft 710 is placed in the tail stock of the spin forming lathe and the rear shaft 790 is driven by the chuck of the spin forming lathe. In order to take up what could be a substantial lateral force from the spin forming wheel or tool, it may be necessary to add a semi-circular, circumferentially disposed yoke/collar/collet comprising a multiplicity of opposing support surfaces that resist the force from the prime spin forming wheel 750 on the other side of the tube 600 near the front opening 601 in order to minimize the lateral stress on the shafts 710 and also 790 as well as the tube 600.

The top end mandrel 720 provides a rounded corner 725 and associated radial taper towards a substantially perpendicular meeting with shaft 710 at 715 with a diameter commensurate with the flanged opening 621 in the tube top, por front, end. The contour, shape and size of this rounded corner 725 are such as to result in the desired contour, shape and size of the top end cap 622,623 and flanged opening 621 upon spin forming. The spin forming of this end cap may require a source of heat 760 to anneal the tube metal and keep it from work hardening during the spin forming process. A spinner wheel or forming tool 750 then traverses a predetermined path, normally from right to left (alternatively described as counter clockwise) in FIG. 7, and under CNC control. The traversal resulting in the spinner wheel pressing against the tube lip and forming it to the front mandrel shape 725, usually in several progressive passes. This operation is under CNC control but may alternatively be accomplished manually by a skilled technician skilled in the art of spin forming.

After this spin forming operation, if the flanged opening 621 is not precisely large enough, it may require a follow-on operation to trim the flanged opening 621 to the desired diameter. Ideally this is performed on the same lathe as the spin forming in order to ensure registration and minimize the number of operations. After this operation, the injector head assembly 400 may be inserted into the flanged opening 621 from the back, or bottom, end 609 of the tube 600 and welded or otherwise fixed to the flanged opening 621 to close it out as previously described for FIG. 6.

Next, mandrel 720 and shaft 710 are removed from the spin forming lathe (FIG. 8) and the injector head 400 is inserted into and fixed to the tube flanged opening 621 as described for FIG. 6. A shaft 810 is temporarily affixed to the oxidizer port 540, for example, by screwing an end of a threaded shaft 810 it into a mating female thread inside the oxidizer port 540. Additionally or alternatively, shaft 810 may be fitted with a flanged end which is screwed into receiving threaded holes (not shown) in the top flange face 525. The shaft 810 may take the place of shaft 710 allowing for that end of the current inner shell liner assembly 660 to be supported and turned in the spin forming lathe. Shaft 810 may comprise a slightly flexing material such as graphite epoxy or a flex joint to positively prevent forced flexure at the mounting point 540 should such flexure be deemed potentially damaging.

Figure 8:
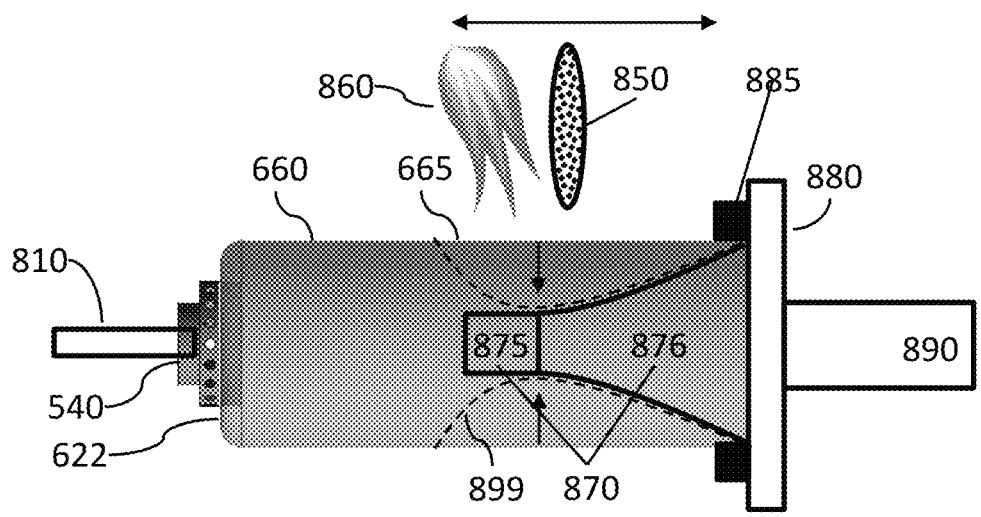
FIG. 8 is a side view showing mounting an injector head to a top flange end cap.

FIG. 8 shows that tail stock mandrel 770 may be swapped out for a different mandrel 870 comprising a shaped contour 876 that provides the De Laval back end shape of the rocket nozzle 440 from the throat 453 to the bell exit 455 for the inner shell liner 460,660 and a short further extension along the axis 875 of a diameter of the inside of the throat 453. The largest diameter of 876 is substantially the same as the inner diameter of the bottom of the tube609] so that it provides a tight friction fit when mounted to the mandrel. A stop 880 is provided to restrict travel of the tube 600 between the spin forming chuck and tail stock and an optional positive clamping means 885 may also be provided to ensure a firm grasp of the tube 600 during the spin forming operation. The entire rear mandrel assembly 870,876,875,880] is mounted to a tail stock shaft 890 for mounting to the tailstock of the spin forming lathe. Shafts 810,890 may be reversed in their role of chuck or tail stock support.

After mounting and set up, the inner shell liner assembly 660 is rotated in the spin forming lathe using a laterally disposed spin forming wheel or tool 850 that presses inward while traversing back and forth axially under CNC control or a skilled technical in order to collapse the diameter of tube 600 in the proximity of the desired axial station of throat 453 until it meets the mandrel 870 thereby conforming to it. When done, the tube 600 has an axially symmetric profile 899. Heat 860 may be applied to anneal the metal and keep it from becoming excessively work hardened. Some level of work hardening is likely preferred by the end of the operation to provide a maximum strength and this may be computed into the spin forming process. Alternatively, a tempering operation may be applied to achieve the desired hardening and strength. An outward directed flange may also be spin formed into the nozzle end lip circa 490. Following this operation, the inner shell liner 460,660 is substantially complete. Tests are performed on the assembly to ensure material and fabrication integrity and quality. A final inner shell liner 665 is the final result (FIG. 9).

Figure 9:
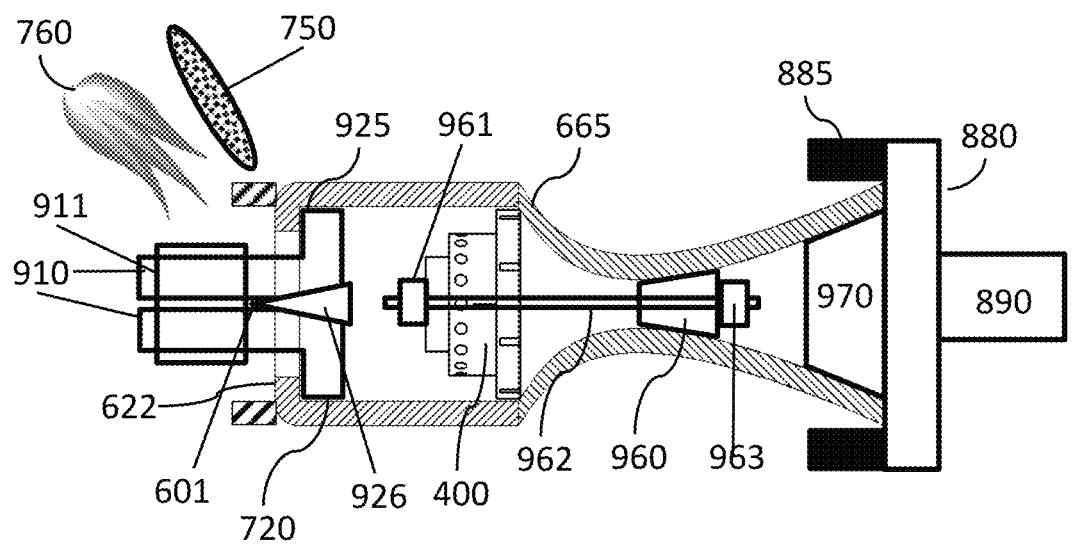
FIG. 9 is a side cross-sectional view showing formation of an inner shell liner assembly.

One alternate approach to assemble and form the inner shell liner assembly illustrated in FIG. 9 is to spin form the nozzle section first as shown in FIG. 8, without the front top bend and flange at 622, that is, leaving the tube open at 601. The injector assembly 400 is inserted through the top opening 601 and secured to the top side of the top inside throat with a long through bolt 962 that transits the injector assembly or preferably via a mounting plate affixed to the bottom side 500 of the injector head. The bolt is situated on the tube 600 axis, passing through the throat, into a threaded conical stopper 960 which cannot pass through the throat and is tightened with nut 963 to immobilize the assembly within the tube. This assemblage holds the injector head 400 inside of the tube while the top end flange at 622 is formed substantially according to FIG. 7.

For this process, a custom shaped rear mandrel 970 securely holds the aft end of the nozzle edge at 609. A revised top mandrel is required to hold the top end 601 of the tube and form the required end cap. One such top mandrel is comprised of a multiplicity of individual collet tines 910 with exterior extensions 925 comprising the desired bend radius and shape for spin forming 623, 622 and 621, held together by spindle 911 and conic wedge 926 which may be drawn up axially to the left by a coaxial bolt (not shown) to spread the collet tines outward against the inside of tube 600 near 601 all of which together provide both support of the tube end and also provide the shaping mandrel 720 for spin forming the end cap comprising 621, 622, and 623.

End support of tube 600 may also be effected by or augmented by semi-circular circumferentially disposed yoke/collar/collet comprising a multiplicity of opposing support surfaces that resist the force from the prime spin forming wheel 750 on the other side of the tube 600 near the opening 601 in order to minimize the lateral stress on the spindle shaft 911 and also 790. The end cap may then alternatively be formed in free space by spin forming wheel 750 following progressively smaller radius sweeps to form the end cap surfaces 622 and 623 without a mandrel or by employing a second spin forming wheel or tool (not shown) interior to tube 600 near opening 601 diametrically opposed to exterior spin forming wheel or tool 750 in a pincher fashion capturing the tube flange near 601 between both the wheels/tools and forming the required end cap flange shapes 622 and 623 under CNC or skilled spin forming technician control.

After the end cap spin forming operation is complete, the conical stopper 960 is loosed and unthreaded from the face of the injector head 400 and the loose injector head is manipulated up to the new flange at 622 and fixed to the tube substantially as described for FIG. 6. This reduces the stress imparted onto the injector head and allows access to both end edges of the tube for spin forming the nozzle at the same time and a potentially less stressing spin forming processes.

Figure 10:
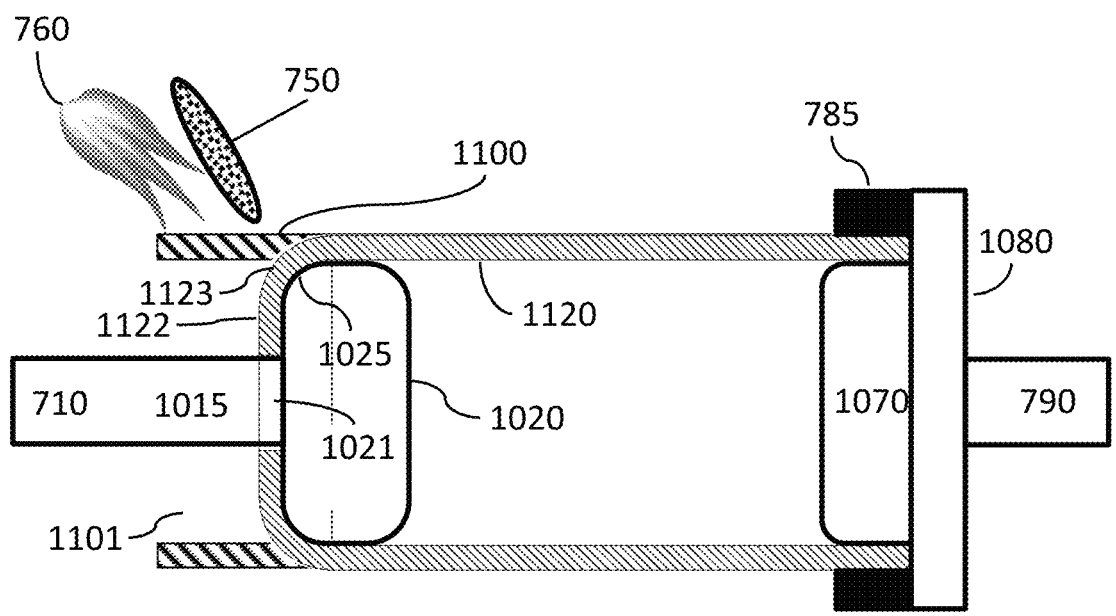
FIG. 10 is a side cross-sectional view of spin forming an outer shell liner comprising a flanged end cap.
Figure 11:
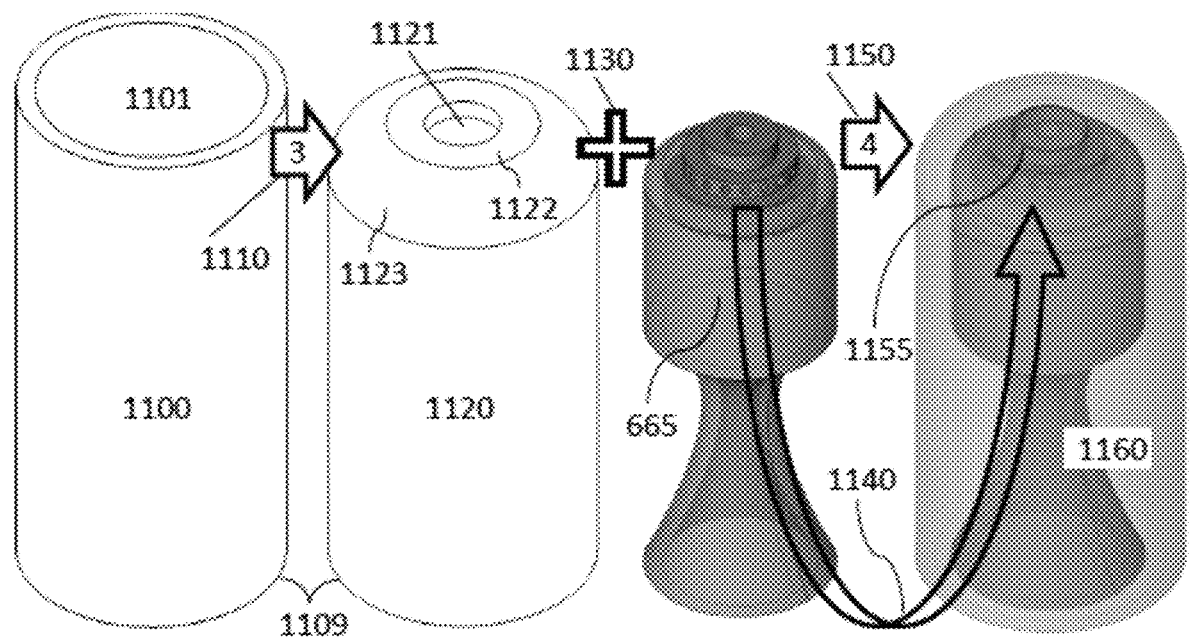
FIG. 11 illustrates a sequence of steps in which an inner shell liner is inserted into and affixed to an outer shell liner.

The completed inner shell liner 665 is set aside and the outer shell liner tube 1100 is mounted into the spin forming lathe ready for forming its end cap as shown in FIG. 10 which is step 3 1110 in FIG. 11. The process for forming the end cap at 1101 on tube 1100 uses a substantially similar process to that described for FIG. 7. A larger end mandrel 1070 with end stop plate 1080 and clamps 785 firmly secures the end 1109 of the tube 1100 and provides mounting shaft 790 into the tail stock of the spin forming lathe. A likewise larger front mandrel 1020 has a shape and curvature 1025 to define the shape of the top flange 1122 and bend 1123 of the top of the tube 1101. A shaft end 1015 helps define the opening 1021 in the tube end cap, the opening 1021 providing snug but facile fit to admit passing flange 535 of the injector head 400 through the terminal hole 1121. Shaft 710 fits into the chuck of the spin forming machine which together with end shaft 790 provide a rigid mounting and support of the tube into the spin forming lathe for the spin forming operations to form the end cap with top flange 1122 and bend 1123 leaving opening 1121 resulting in outer shell liner assembly 1120. The roles of shafts 710 and 790 may be reversed.

The outer shell liner assembly 1120 may be left as is, and inner shell liner 620 may be inserted into it 1140 by inserting it in through the bottom 1109 of 1120 as shown in FIG. 11, and then the outwardly expose edge of flange 535 may be welded to the edge of opening 1121 to complete an outer shell liner assembly 1160 that is an almost complete rocket engine. Additionally or alternatively, mounting bolts can be used to pass through holes in flange 1122 into threaded holes in flange 525 of the injector head 400 to secure the assembly together. Seals may be used between the contacting surfaces. This results in a collinear and coaxial assembly of the inner shell liner and the outer shell liner with the injector head 400 registering and securing the two liners together. Additionally, because the entire outer surface of the inner shell liner is exposed to coolant, heat is efficiently transferred directly to the coolant in the coolant plenum 480.

Although a large coolant surface is provided in the arrangement shown in FIG. 11, additional cooling may be needed about the nozzle throat where the heating load is the greatest. A first means of increasing the cooling about the nozzle throat is to feed the coolant plenum thorough an annular coolant injection ring manifold of the volute kind, circumferential to the nozzle throat mounted to outer shell liner as shown in FIG. 12A outside view, FIG. 12B vertical cross-sectional view, and FIG. 12C horizontal cross section through the outer surface 431 and inner surface 453 of the throat 430 of the outer shell liner assembly 1160 with the added coolant injection ring manifold 1210 which encloses the coolant injection ring manifold channel 1220 into which coolant is injected via a supply line (not shown) exterior to the manifold 1210.

Figures 12A, 12B, 12C:
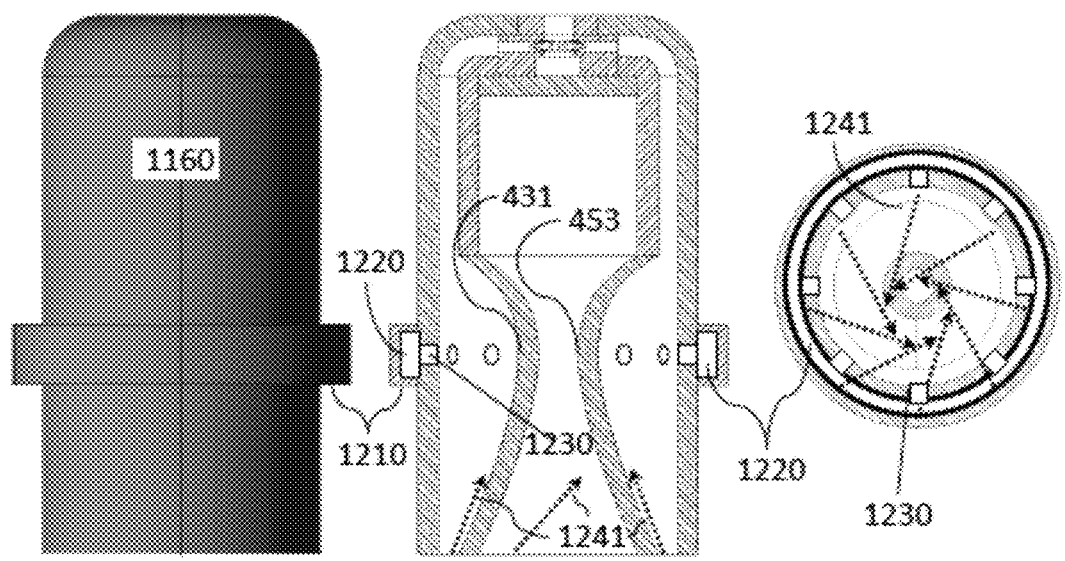
FIGS. 12A-C are side, side cross-sectional, and top cross-sectional views of an exterior cooling manifold ring comprising ports applied around the circumference of an outer shell liner.

FIGS. 12B and C show a multiplicity of holes/ports with optional injectors 1230 on the inner wall of the manifold piercing the coolant manifold and the outer shell liner at a multiplicity of points along its circumference, and directing a high pressure jet of coolant 1240 directly onto the outer surface 431 of the inner shell liner at the throat 430 and substantially tangent thereto in order to form a rotational flow about the axis of the rocket engine at this axial station and tangent to the nozzle throat outer surface 431. Given that the coolant flow must then exit from this local somewhere, it takes on an axial velocity component as it flows away from its axial injection point. In this way heat is removed quickly from the outer surface 431 of the nozzle throat 430 by the convective cooling from the high velocity jets and transferred to the coolant. The coolant, being a propellant, is routed into the rocket combustion chamber or heat exchanger via the propellant ports 523 or recirculated otherwise to propellant pumps that reintroduce the propellant for consumption such as into propellant port 540. Coolant may also be directed downward towards the exit end of the rocket bell 455 where it may be collected in an engine exit coolant manifold 490.

The precise axial location of the manifold 1210 and associated holes/ports and optional injectors 1230 need not be stationed exactly at the throat 430 and may be stationed forward or rearward thereof. The jets of coolant 1241 may need to be directed partially in an axial direction in order to target the throat 430 with maximum coolant flow. Additionally, the return flow may need to be redirected and specifically engineered to accommodate the specific location of the coolant manifold 1210 and other return manifolds may need to be added at different axial stations to accomplish this.

A slightly different approach to the injectors 1230 providing jets of coolant 1240 directly opposed to the throat 430 and providing tangential circulation, is to integrate the injectors 1230 into the exit manifold 490 and provide an axial vortex flow circulation for cooling the throat and engine 1241. A rocket engine may introduce coolant at an axial station below the throat 430 and even as far down as the bell end 455. In this embodiment the coolant is provided from the engine exit coolant manifold 490 fed from an exterior line coming from a propellant pump or tank. The holes/ports with optional injectors 1230 is relocated into the manifold 490 and pointed upward with a circumferential rotational component in order to direct jet flows 1241 to create a vortex flow up and over the engine bell and throat 430.

FIG. 13 illustrates an approach to increasing coolant flow past the nozzle throat 430 by adding a collar around the throat which blocks circumferentially exterior flow while forcing coolant flow to pass nearest the throat surface. Baffle 1310 prevents fluid passage exterior to collar 1320 encircling the throat 430 of the inner shell liner. The baffle 1310 is shown solid but may comprise small holes to prevent entrapment of gas, particularly during engine start up. The collar 1320 may be applied to the throat in two or more semi-annular sections bolted together circumferentially, thereby firmly gripping the throat 430. Since the throat is the narrowest diameter in any adjacent axial station, the collar is then held firmly in place axially by geometry and held in place circumferentially by a tight frictional fit and/or weld or other fastening means. The collar is made of a metal alloy with good tensile strength and with an expansion coefficient that when integrated into the design will not expand faster than the expansion of the throat, least the collar be then susceptible to movement.

The collar 1320 has substantially axially aligned curvilinear channels 1330 cut into its inner face adjacent to the outer surface of the inner shell liner 431. Only four such channels are shown in FIG. 13 for clarity, but generally there are many more and of relatively smaller cross section. This leaves one side of each the channel comprising a section of the outer surface of the inner shell liner at the throat outer surface 431. These channels together with the baffle pressurize one side higher than the other side to provide a resultant pressure difference that accelerates coolant to a higher velocity through the channels 1330 and likewise at the same or similar velocity across the section comprising sides of the channel 1330. The channels may also have different heights and widths at different axial stations in order to slow down or speed up the flow to achieve different cooling rates at different axial stations. In this way the coolant may be focused for most effective cooling at the highest heat loaded portions of the rocket engine at the throat 430. Additionally, the side wall landing 1340, also referred to as channel wall thickness, of the channel wall on the outer throat surface 431 can be axially adjusted as desired to maximize heat flow and heat flow uniformity, generally by making the landings 1340 as narrow as possible unless thermal analysis of resultant heat flow indicates otherwise.

A related method for increasing coolant flow past the nozzle throat 430 potentially without the baffle 1310 is to extend the coolant channels 1330 to the exit manifold 490 and the combustion chamber coolant plenum 482, essentially enclosing the entire nozzle in a thin shell with a prescribed gap distance axial profile above the inner shell liner 665. Such a shell collar captures the majority of coolant flow near 490 and directs it up and over the throat and out to the combustion chamber, while the larger bulk of the fluid 1350 flows more slowly. Such a collar acts as a deflation plate and need not provide significant structural strength and may be applied in two or more azimuthal shell sections with fastens or other fixation means.

The above approaches may be combined with the others, thereby injecting coolant both into the engine exit manifold 490 and the throat manifold 1210 to combine the flows upwards towards the injector head 400. Alternatively, the flow can remove coolant through manifold 490.

FIG. 14 illustrates the process for spin forming the nozzle throat constriction with axisymmetric curvilinear body of revolution contour 1499 into the outer shell liner assembly 1160. This constriction then serves a similar purpose as baffle 1310 and collar 1320 with the remaining gap between the inner and outer shell liners serving similar function to the channels 1330. This gap comprises the coolant plenum with an axially defined gap that modulates the coolant flow velocity in the gap approximately inversely to the size of the gap, with wider gaps resulting in slower coolant flow with commensurate less cooling of the inner shell liner at that axial station and narrower gaps resulting in faster coolant flow with commensurate more cooling of the inner shell liner at that axial station.

The spin forming process for the outer shell liner assembly 1160 shown in FIG. 14 is substantially the same as it was for the inner shell liner of the assembly 665 for FIG. 8. Shaft 810 may be reused by threading it into the propellant port 540 and/or with an adaptor flange secured with bolts to expose injector head flange 535, of exposed injector head 400, all attaching securely to the top of outer shell liner assembly 1160. Additionally or alternatively, a similar semi-circular circumferentially disposed yoke/collar/collet comprising a multiplicity of opposing support surfaces that resist the force from the prime spin forming wheel 850 on the other side of the exterior of outer shell liner assembly 1160 may be used to minimize lateral stress on the spin forming chuck and its shaft 810 and also the tail stock and tail stock shaft 890. The roles of the chuck and tail stock shafts may be reversed if advantageous to the spin forming operation.

On the bottom end 1109 of outer shell liner assembly 1160, the bottom is secured to the tail stock of the spin forming lathe with rear shaft 890 to which is mounted a larger backing plate 1480 onto which is mounted the rear mandrel 870, which firmly holds the throat of the completed inner shell liner 665 as shown. This may be accompanied by or substituted with an additional larger ring mandrel 1485 which inserts into the gap 1490 (which becomes the coolant plenum gap 480) between the outer shell liner and the inner shell liner further comprising the coolant plenum. This ring mandrel helps support and hold rigid the whole structure during the spin forming processing of the nozzle shaping of the outer shell liner and enforces the precise same spacing around the circumference of the rocket engine bell exit, specifically between the outer shell liner and the inner shell liner that instantiates the coolant plenum. Clamps 885 secure the outer shell liner assembly 1160 into the rear supporting mandril assembly. The spin forming wheel or tool 850 is applied and run up and down the longitudinal axis over the nozzle region while the lathe is spun as prescribed by CNC or skilled spin forming technician manipulation of controls to make a reduced diameter axisymmetric curvilinear body of revolution with the desired nozzle shape of curve 1499 selected to provide the desired gap 1490 between the outer shell liner and the inner shell liner in the nozzle region 430.

The gap 1490 is shown as substantially uniform in size throughout the nozzle and the entire coolant plenum but this is not necessary. For example, a detailed thermal and flow analysis may be computed and coolant flow and fluid dynamics modeling may be used to determine the gap needed at a particular station to provide local coolant flow at that axial station for its diameter in the coolant plenum, and to balance that with total coolant pressure and total coolant flow rate planned for the rocket engine. Additional spin forming steps may be used to change the gap size along axial points of the rocket engine, such as along the length of the combustion chamber. In this way, most any desired gap size can be accomplished at disparate axial stations along the rocket engine length, depending on the cooling requirements for that axial station.

The result of these operations is the completed rocket engine shell assembly 1500 in FIGS. 15A and 15B comprising all components of the rocket engine except for closeout of the coolant plenum circa 490. FIG. 15A shows an exterior side view of the rocket engine shell assembly 1500. FIG. 15B shows a central vertical cross-section exposing the three main subassemblies: the inner shell liner 460, the outer shell liner 470, and the injector head 400. Also shown for reference are the injector face 500 of the injector head and the coolant plenum 480. Any of the enhancements such as coolant manifold 1210 and its associated elements may be applied to the final assembly embodiment 1500, with potentially added benefits such as being smaller and lighter weight since they will encircle a smaller outer shell liner nozzle diameter at the throat station along the axis and providing added hoop stress strength and mounting points.

Widely spaced standoff tabs may be applied to the outside of the completed inner shell liner assembly 655 before being enclosed into the outer shell liner assembly in order to precisely enforce the gap spacing throughout the engine coolant plenum. The standoff tabs have a thickness about the same as the desired coolant plenum gap at each station both axially and circumferentially to prevent the spin forming process from collapsing the outer shell liner too far, and the tabs may be fixed by brazing, welding, mechanical fasteners, or combinations of these. An approach similar to that used in stud welding or spot welding may be used for rapid adhesion of numerous tabs to the 655 outer surface.

Additionally or alternatively, the inner shell liner may be encircled with a multiplicity of azimuthally distributed axially aligned metal spacer rods, tubes, channels or metal cables that, when covered by the outer shell liner, act as standoff spacers that prevent collapse of the coolant plenum gap. This may be achieved with the use of fixation collars 1610 and 1690 shown in FIG. 16C, which hold the metal spacers spacer rods, tubes, channels or metal cables between the top and bottom ends of the rocket engine. The metal spacers can be held in tension during spin forming but be allowed to feed additional length as the spin process proceeds, and then be tied off to a permanent length and tension inside the coolant plenum. The inner shell liner assembly 655 may be inserted into the middle of metal spacers spacer rods, tubes, channels or metal cables and then a hoop like ring support in place of or in addition to 1690 may be placed below and coaxially to shell liner assembly 655, at which point all the bottom ends of the hanging metal spacer rods, tubes, channels or cables are attached at like azimuthal points.

With the metal spacer rods, tubes, channels or cables securely fixed to both the upper and lower hoop ring supports, the two supports are twisted about their mutual axis which is also coincident with the axis of the inner shell liner, forming a vortex arrangement 1600 out of the metal spacer rods, tubes, channels or cables about the external of the inner shell liner 665 as shown in FIGS. 16A-C. Being twisted sufficiently tightly, the metal spacer rods, tubes, channels or cables are held tight against the surface of inner shell liner 655. Top and bottom fixation collars 1610 and 1690 are applied and tightened to the top and bottom of the inner shell liner 665, and each metal spacer rod, tube, channel or cable is fixated to the top and bottom fixation collars 1610 and 1690 via welding, brazing or mechanical fasteners. The collars 1610 and 1690 are then fixed to the inner shell liner 655 and the metal spacer rods, tubes, channels or cables 1600 are fixed to the collars, thereby providing support to keep them in place while the outer shell liner is subsequently spin formed over them, while they enforce a design to gap distance in the coolant plenum. If additional fixation is needed, additional fixation collars 1620 and 1650 may be used at key stations requiring added fixation support to the metal spacer rods, tubes, channels or cables. The coolant plenum end cap 490 may also provide an anchor point for fixation collar 1690 and throat collar 1320 may also provide an anchor point for fixation collar 1650. In some embodiments, injector head 400 may be designed to provide an anchor point for fixation collar 1610. Other mechanical means may also be employed to assemble the metal spacer rods, tubes, channels or cables into the coolant plenum as might be devised by those skilled in the art of mechanical engineering and fabrication.

Figure 17A:
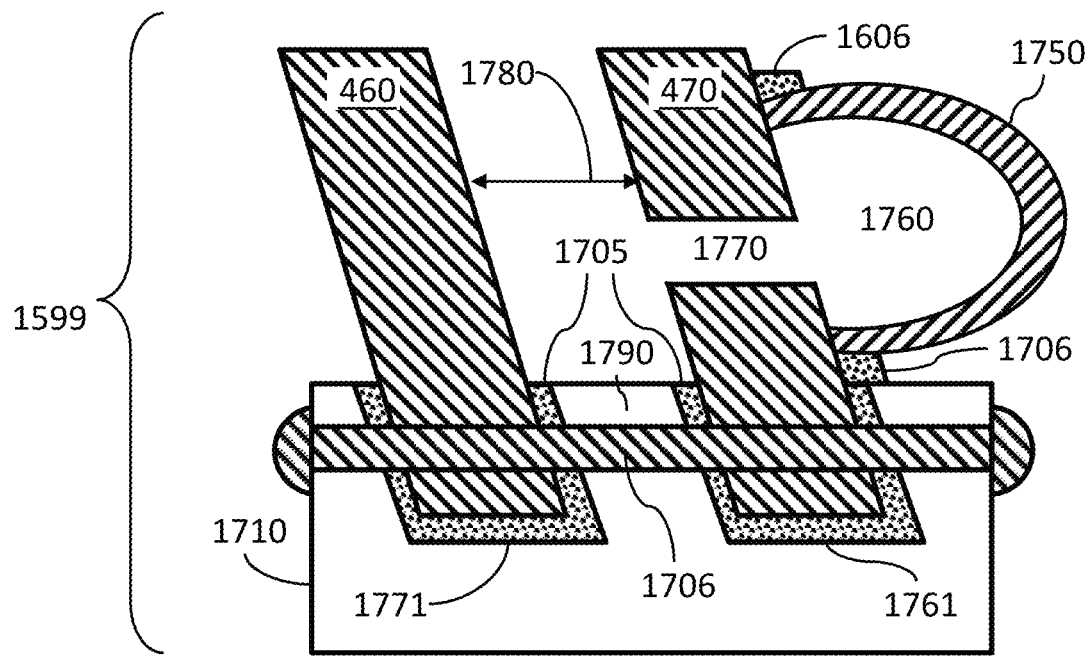
FIGS. 17A-C are cross-sectional views of three different embodiments of a nozzle end cap.

The coolant plenum 480 is enclosed at the nozzle bell exit end 455 of the rocket engine as shown at 1599 in FIG. 15B with a closure and associated coolant manifold 490. A first embodiment of a cooling plenum enclosure for closing the coolant plenum is shown in FIG. 17A and comprises a substantially rectangular cross section ring end cap 1710 of a strong metal that is jointly compatible with the inner shell liner 460 metal and the outer shell liner 470 metal. Ring end cap 1710 comprises mating recessed grooves 1761 and 1771 in its top side, substantially facing the injector head 400, that are sized to accept the thickness of the inner shell liner 460 metal and the outer shell liner 470 metal respectively, with a distance 1780 between these grooves substantially the same as the coolant plenum gap 484 distance located at the 1599 axial station.

The ring end cap 1710 may be fastened to the shell liners 460 and 470 by welding or brazing 1705, and/or using fasteners 1706 circumferentially around the entire end cap ring 1710 to positively seal it against the pressures and stresses experienced during rocket engine firing. Although the end cap ring 1710 is shown parallel to the nozzle exit plane thereby accepting the shell liners at an angle, the end cap ring 1710 may be made so as to terminate the shell liners substantially perpendicular to the surface of the shell liners, thereby eliminating any need for diagonally trapezoidal oriented grooves 1761 and 1771, thereby using more common and less expensive rectilinear groves with respect to the cross section of the end cap ring. The penalty for this is the need to bend the straight stock metal of the end cap ring with a canted and double sided roller machine. The inner and outer shell liners may also be finished with a slight angular flange to make their terminal edges vertical for acceptance into a simpler rectilinear perpendicular grooves 1771 and 1761.

To complete the end cap closeout, entry holes/ports 1770 may be drilled circumferentially through and along near the edge of outer shell liner 470 analogous to through holes/ports and optional injectors 1230, the size and spacing of the holes/ports determined by both structural integrity requirements and coolant flow requirements. The coolant admitted through the entry holes/ports 1770 into the coolant plenum 1780 and 480 derives from a higher pressure coolant manifold 1750, normally of the volute type, circumnavigating the rocket engine outer shell liner nozzle bell edge, which carries pressurized coolant 1760 to all the azimuthal stations along the bell edge. In use, an external, axially aligned feed pipe feeds coolant into the manifold 1750 attached from the outer sider from a propellant tank and/or pump. The coolant manifold 1750 is brazed or welded 1706 or mechanically fixed to the outer shell liner 470 in order to provide a substantially annular tube for providing coolant. This is a substantially similar arrangement to that described in FIGS. 12 and 1210 and can also incorporate injectors to instantiate cooling jets 1241.

An alternate cooling method may be supported wherein channel 1770 is vented to the atmosphere, or alternatively is closed, with cooling manifold 1750 moved up towards or inside of the injector head 400. Coolant flow is thereby reversed to a downward direction and septum 1790 is replaced with a channel like 1770 but venting into the atmosphere. In that case the rocket is non-regeneratively cooled but is made according to an embodiment of the method. Non-regenerative cooling is generally not desired due to loss of propellant and performance, but may be preferable in situations prioritizing lower cost, such as a gravity fed rocket with a direct feed of coolant propellant from a tank through the coolant plenum in parallel to the engine chamber.

Figure 17B:
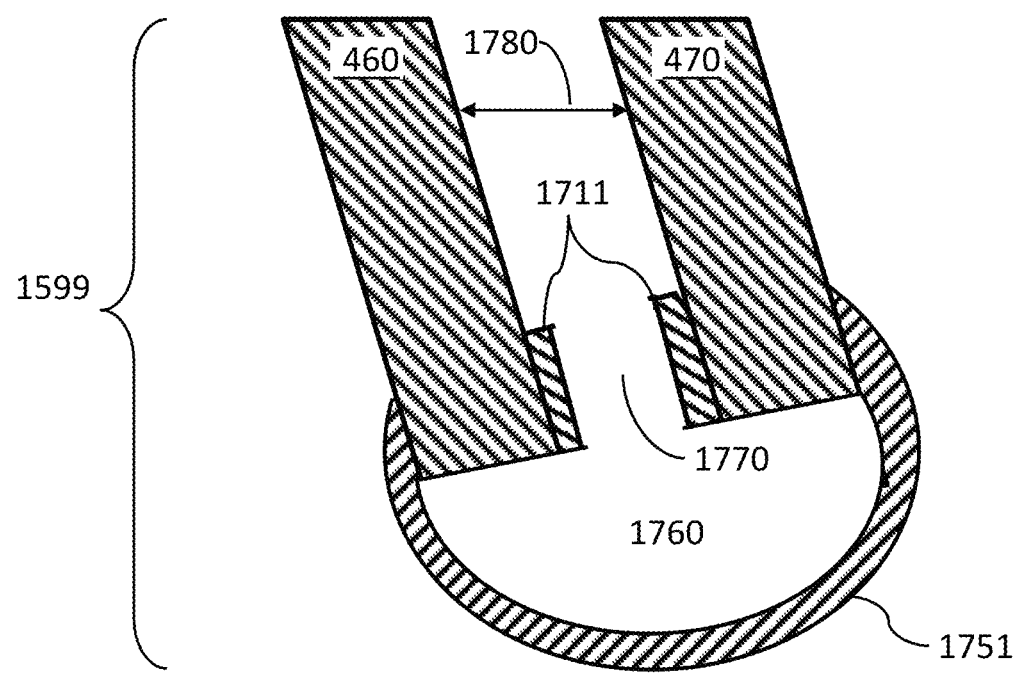

A second embodiment for closing out the coolant plenum 480 is shown in FIG. 17B with brazing, weldings and fasteners not shown for clarity. A substantially cylindrical ring 1711 is mildly wedged and brazed or welded or fastened into the coolant plenum gap 1780 to close out the coolant plenum. The ring 1711 has channels 1770 drilled or cut substantially in the engine axial direction, parallel to the inner 460 and outer 470 shell liners to admit coolant from below the ring to flow up and through the ring 1711 and into the coolant plenum 480. A partially open sided semicircular tube bent into a circle shape incorporates aspects of the circle cooling manifold tube 1751 into an integrated annular semi-tube 1751 that is welded or brazed or otherwise fixed to the inner shell liner 460 and outer shell liner 470 as shown. The diameter of the tube 1751 may change as a function of azimuth to embrace a volute form which will more evenly distribute coolant across the annulus.

Figure 17C:
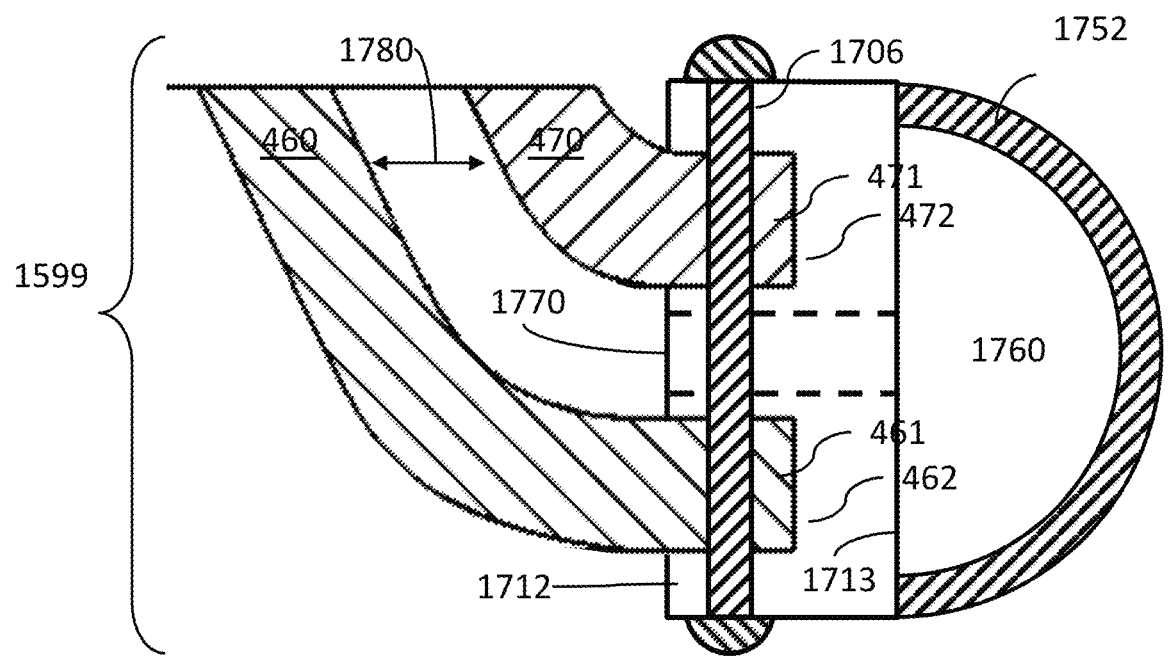

A third, preferred embodiment for the end cap closeout is illustrated in FIG. 17C which incorporates elements of FIGS. 17A and 17B. Flanges 461 and 471 on inner shell liner 460 and outer shell liner 470, respectively are produced during the spin forming processes described herein or they may be formed independently by a separate flange forming process. Flanges 461 and 471 can also be separately formed flanges that are welded, brazed or otherwise fixed to the edge of the rocket bell inner and outer shell liners respectively. Flanges 461 and 471 insert into grooves 462 and 472, respectively and are welded, brazed and/or fixed with fasteners 1706. A particular advantage of this design is that the bend producing each flange naturally provides an axial expansion flexibility to the engine shell liners thereby providing an axial expansion joint for the shell liners. This could be easily reshaped into a true Omega expansion joint not unlike used azimuthally on the Saturn V F1 engine's turbine exhaust volute manifold nozzle injector system. Other circumferential Omega joints may be spin formed and distributed at axial stations along the rocket engine shell liners 460 and 470 as required to relieve longitudinal stresses.

Grooves 462 and 463 are formed on the interior surface of a retainer band 1712 made of a material that is compatible with the metals of the flanges 461 and 471 from a mechanical, thermal, welding, and brazing perspective to accommodate the predicted load and conditions to be experienced during rocket flight. The retainer band has a rectangular cross section as shown in FIG. 17C and tightly encircles the circumference of the edge of the rocket bell inner and outer shell liners as shown, completely sealing the coolant plenum 480. A high strength tensioning cable or tensioning strap (not shown) may be applied circumferentially around the exterior surface 1713 of the band 1712 and tightened in order to provide extra strength against hoop stress. Such a band might also be applied on the outer side of 1752.

A semi-circular annular tube 1752 may be welded, brazed, of otherwise fastened onto any of the exterior exposed surfaces of band 1712 about the substantially complete circumference of the band but preferably onto outward face 1713 to provide the coolant manifold volume 1760 with a volute shape. In use, coolant is fed into the manifold comprised of 1752 and 1713 from at least one feed pipe fed by a propellent tank down flow or from a propellant pump. The coolant, after entering the coolant manifold, is evenly distributed azimuthally about the rocket bell edge by the volute form of the cooling manifold and pressurized to flow through the entry flow channels 1770 which pass the coolant through the band 1712 into the cooling plenum 1780 and thence 480. From there the coolant is pressure fed to flow upwards past the nozzle bell towards and past the nozzle throat and past the combustion/heating chamber finally entering the injector head from where it is injected into the combustion/heating chamber to be ejected from the rocket at high speed producing thrust. In some liquid rocket architectures this flow may be reversed or modified.

For any of the coolant plenum closeouts shown in FIGS. 17A-C, axial expansion joints such as Omega joints may be added or other enhancements made to the closeout bands. Additionally, the close-out band structures 1710, 1711, and 1712 in conjunction with 1750, 1751, and 1752 may be used as a structural mounting bracket to secure a further expansion nozzle extension. This is useful when the expansion area of the tube nozzle end 490 is not large enough to meet requirements for expansion area ratio.

Figure 18A:
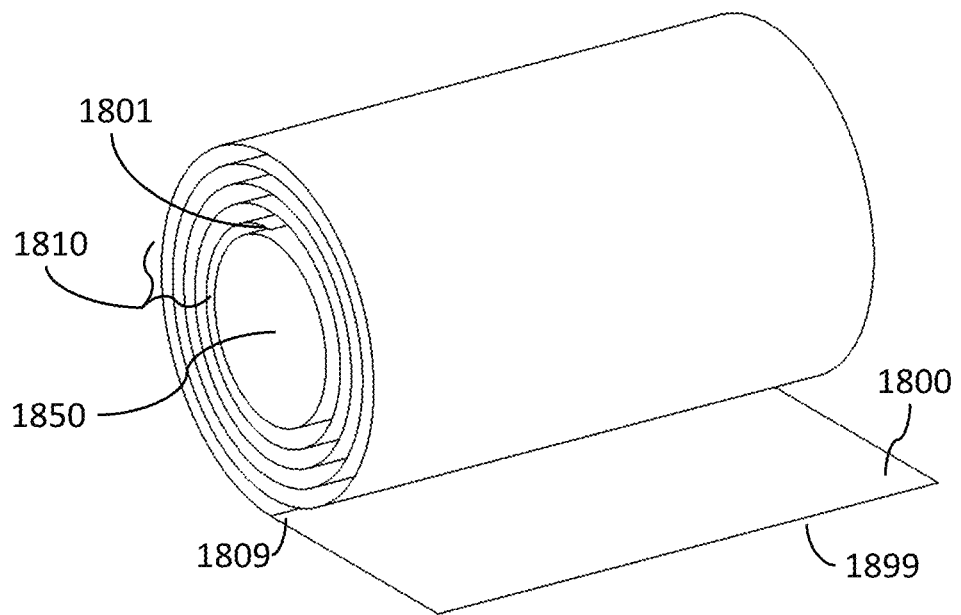
FIG. 18A is a diagram showing wrapping a thin sheet around a mandrel to provide a rolled tube/pipe.

A method to fabricate a desired tube/pipe of a specified diameter, thickness and length from a given metal alloy for making a low cost liquid fuel rocket engine is illustrated in FIG. 18A. The method uses a wrapping paper roll a.k.a. "swiss roll" approach in which a long flat strip of the metal alloy sheet 1800 is obtained either on its own roll or flat, and then laid and kept flat. The thickness of the metal sheet 1800 and the diameter of cylindrical mandrel 1850 are selected together so that, after a number N of tight wraps of the metal sheet 1800 around the mandrel 1850, the accumulated total thickness of N layers of the metal sheet 1800 equals the desired thickness of the objective tube/pipe 600. The front edge 1801 of the metal sheet 1800 is fixed precisely parallel to the axis of the cylindrical mandrel and on its outer surface, for example by using vacuum holes on the surface of a hollow cylindrical mandrel 1850 connected to a high draw vacuum system. A shallow lip on the outer surface of the hollow cylindrical mandrel 1850 about the same height as the thickness of the metal sheet 1800 and aligned axially helps to register the sheet 1800 perpendicular to the mandrel 1850 axis to ensure a straight and even rolling with no axial (i.e. spiral) migration. External guides (not shown) on both the near and far ends of the roll 1850 can further help to guide the sheet 1800 straight onto the roll as it is wound around it.

After initializing the leading edge 1801 of the sheet 1800 on the cylindrical mandrel 1850, the end of the sheet 1899 is held suitably taught while mandrel 1850 is rotated such that the sheet 1800 is wound N+½ times around the mandrel. Alternatively, this may be described as rotating the mandrel enough to achieve at least N thicknesses of the sheet 1800 at all azimuthal stations about the axis of the cylindrical mandrel, while terminating the front edge 1801 and terminal cut line 1809 at substantially opposite azimuthal stations 180 degrees apart in azimuth about the axis of mandrel 1850. Mandrel 1850 need not be exactly cylindrical and may take on other shapes that may facilitate fabrication of the objective rocket engine. For example, the mandrel may have a conic shape to facilitate the construction of the rocket engine by reducing the amount of forming deformation required afterwards to form the bell. The mandrel may also take on a biconic shape to facilitate formation of the nozzle and throat. An objective mandrel may take on the shape of the form of the rocket engine proper, with its full nozzle curve. As more shaping is added to the mandrel, more careful rolling of the sheet metal 1800 is needed, most specifically increasing the tension while rolling and ideally stretching the metal sheet, while continually annealing it to prevent work hardening. The extent to which this can be done depends on the plasticity of the metal being used and the level of process controls to facilitate plastic stretching while not tearing the metal sheet 1800. Even partial adaption to parts of the counter will lessen the amount of forming deformation needed subsequently and will facilitate keeping subordinate layers aligned as desired.

Figure 18B:
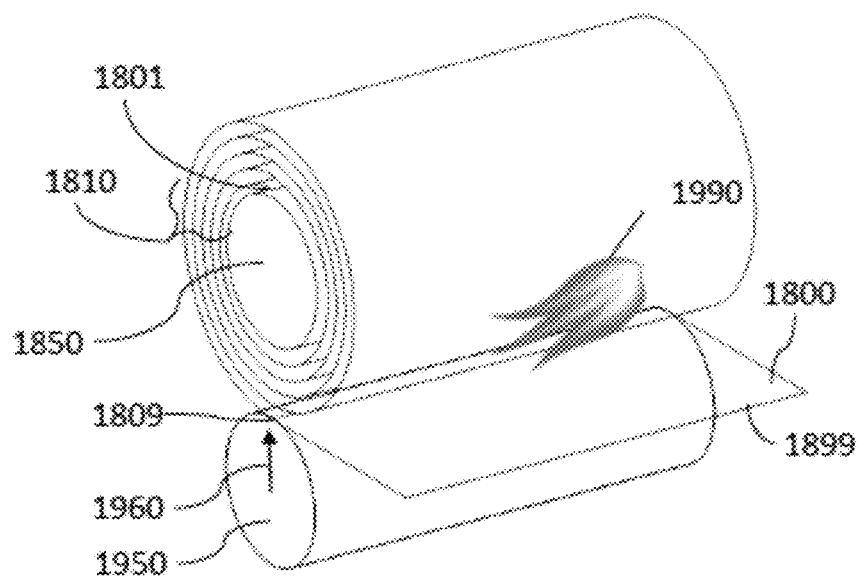
FIG. 18B is a diagram showing a processing method for a rolled tube/pipe.

Each sheet winding layered on the roll may also be hydraulically pressed onto the roll by another opposed roll 1950 or other press as it is wrapped thereto as illustrated in FIG. 18B so as to ensure a maximum metal to metal contact for best heat transfer through the thickness of the resultant tube/pipe. The metal sheet 1800 is kept clean and oxide free to facilitate a best layer to layer contact and thermal bonding. A thin brazing paste may be applied to the face of the sheet being fed into the cylindrical mandrel followed by a furnace brazing step of the whole tube/pipe.

Once the appropriate amount of metal sheet 1800 has been wound on the mandrel 1850 to provide the objective tube/pipe 600, the sheet may be fixed to the underlying exposed tube/pipe outer surface ahead of the cut line 1809 and trimmed at the cutline to define the new tube/pipe 600. To minimize any impact to material strength and avoid distortions, cut line 1809 is not located atop the start point 1801 azimuthally, but rather disposed approximately diametrically opposite as shown from 1809 and 1801 in FIG. 18A in order to have unaltered metallurgy on all the layers save for the inner most and outermost at those points. Fixation may be performed by a number of different means including welding, brazing, mechanical fasteners, and combinations of these.

Once the outer metal sheet edge at the cut line 1809 has been secured, the cylindrical mandrel 1850 may be removed from the tube/pipe assembly with its N layers 1810. This may be accomplished by cooling the cylindrical mandrel 1850 while heating the new tube/pipe or by a mechanical release means built into the mandrel. Once the new tube/pipe 1810 is released from the mandrel, then the inner edge of the metal sheet 1801 may be fixed to the inner exposed surface of the tube/cylinder 1801 in one or more manners as described for the cut line edge 1809 above.

A further improvement can be obtained with the "swiss roll" approach by adding a high pressure bottom press roller 1950 to introduce contacting at the sheet-to-roll contact point given previously as the cut line 1809 as shown in FIG. 18B. After one full wrap of the sheet 1800 onto the roll 1850, the compression force from the bottom roller 1950 to the upper roller 1850 is increased to a predetermined pressure sufficient to produce pressure bonding and/or diffusion welding or HIP fusing when heat 1990 is applied and suitable steps are taken to maximize the bonding.

For diffusion welding or HIP fusing in particular, the sheet 1800 is carefully prepared by thorough cleaning and surface preparation to include wire brushing/roughening, and a suitable acid etch and neutralization to remove all surface contaminants and any oxidation layer. This is preferably done in a vacuum or inert gas environment to prevent immediate re-oxidation. A preferred method involves a suitable enclosure around the tube and the sheets to be added to the roll and purging the enclosure with an inert gas such as nitrogen, argon, or carbon dioxide. For the diffusion welding or HIP fusing process, heat may be applied by flame, electric ceramic heaters and/or induction heating. A complete bond may not be needed and possibly not desired because subsequent spin forming imparts a degree of diffusion welding or HIP fusing. Rotation during the spin forming process is preferably in the same direction as the roll wrap was produced so that rotational creep is pushed to the outer welded edge where it may be redressed if needed.

Figures 19A, 19B:
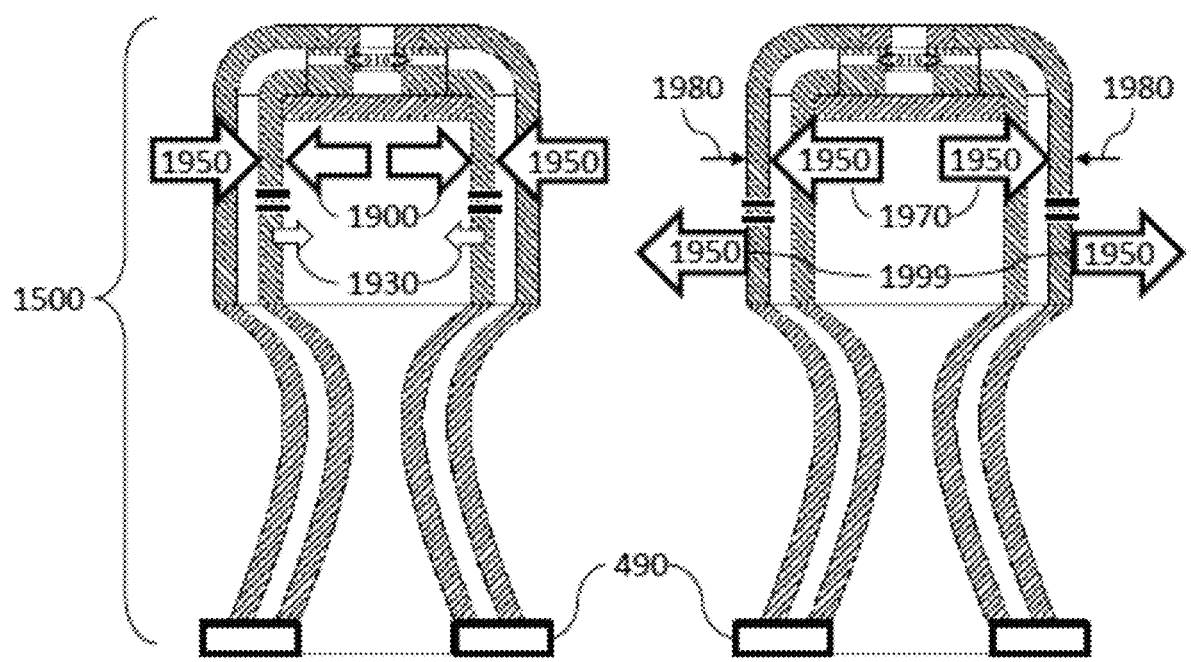
FIGS. 19A and 19B are side cross sectional views of a low cost liquid fueled rocket engine to illustrate reducing pressure on the inner shell liner by raising coolant pressure.

FIGS. 19A and 19B illustrate how raising the coolant pressure reduces the pressure on the inner shell liner. In modern regenerative rocket engines, coolant is fed into the engine as propellant and requires the injected coolant to be at a higher pressure than the combustion chamber. If engineered purposely, the pressure differential between the combustion chamber and the coolant plenum can be made small about the combustion chamber and the throat and this pressure may be managed over the length of the rocket through management of the coolant plenum pressure with additional entry and exit manifolds managed by differently pressurized sources or pumps.

The operation of the rocket engine described may take on two modes of operation depending on how designed. In a first modality, the coolant pumping pressure is low. In this case the inner shell liner, nominally constructed of copper alloy, must be strong enough to contain all the pressure of the combustion chamber. This could result in lower chamber pressure for operation than other engines. However, this is not necessarily an issue when total cost is the primary metric, and the engines are the primary cost driver, and when this engine is so much less expensive to fabricate. In a second modality, coolant is at a significant pressure on the order of the chamber pressure. In this case, the fluid pressure of the coolant pushes back against the chamber pressure such that the inner liner need not take all the pressure stress from the combustion chamber, and potentially only a fraction of the total pressure stress generated from the combustion chamber. If the coolant is suitably pressurized, then almost all of the chamber pressure stress can be transferred to the outer shell liner, which, typically being of stronger materials such as stainless steel, and also comparatively cooler, provides a better means for providing the mechanical structure needed to contain the combustion chamber pressure. In this way the inner shell liner may be made comparatively thin, since most of the stress is transferred to the outer shell liner. By way of example, if the combustion chamber operates at 2000 Pounds Per Square Inch (PSI) pressure and the coolant operates at 1100 PSI, the inner shell liner and outer shell liner only need to support 1100 PSI of pressure (the difference between the coolant pressure and the combustion chamber pressure). In practice the differential pressure on the inner shell liner is preferably designed closer to zero with the majority of the pressure stress taken up by the exterior shell liner. Some level of strength needs to be maintained in the inner shell liner to accommodate the non-uniform pressure waves produced during rocket combustion.

FIG. 19A shows combustion chamber pressure 1900 being outwardly directed onto the combustion chamber side wall of inner shell liner 460. Countering this outward force is the pressure 1950 inside the coolant plenum 480, which must be a larger pressure than 1900. This results in a small compressive net pressure 1930 on the inner shell liner, as long as the cooling plenum head pressure is not too high. If the pressure differential 1930 is small, then the inner shell liner 460 need not be that strong. Because the coolant plenum is substantially similar in pressure to the combustion chamber or can be made so, the actual static pressure load incurred by the inner shell liner is not large.

Instead, as illustrated in FIG. 19B, the net force 1970 pressing outward against the outer shell liner 470 is the same pressure 1950 as that of the coolant plenum 680, which is only slightly higher than the combustion chamber pressure 1900 and this is the force transferred to the outer shell liner 470 results in the same net internal tensile pressure 1999 on the outer shell liner as the coolant plenum 1950. Since the over shell liner is of a strong tensile strength material such as stainless steel operating at the low temperature of the coolant, it is well suited to carry the stress of this pressure load. And since it is exposed to coolant on the engine side, it need not endure high thermal loading. These design trades and synergisms enable a relatively weak inner shell liner of a copper alloy, but with high thermal transfer performance so it does not burn through, to operate successfully in direct contact to a very stressing pressure and thermal environment even though by itself it would fail. In turn this enables the lower cost rocket design of the invention.

FIGS. 20A and 20B show layered, composite materials for making a rocket engine shell liner. A high strength layer 2110 comprises a relatively high yield strength material with a relatively high temperature threshold and preferably a relatively low expansion coefficient. A high conductivity layer 2120 comprises a relatively high thermal expansion coefficient material compared to layer 2110 and expands commensurate with the expansion of the first layer 2110 under higher temperature conditions. For a given temperature increase when the rocket is firing, high strength layer 2110 expands less than high conductivity layer 2120 and, because it has a high yield strength, can be made thin to efficiently pass heat to high conductive material 2120 and thereby prevent excessive heating that lowers yield strength. By choosing the materials accordingly, the expansions of the two layers can be arranged to be substantially similar to minimize thermally induced shear. With sufficient reduction of thermally induced shear, neither layer 2110, 2120 exceeds its yield strength. The high conductivity layer 2120 is kept cool by its contact with the coolant and having a high thermal conductivity, and the high strength layer 2110 is kept cool by being thin and in contact with the high conductivity layer 2120. In this way the mechanical strength and temperature resistance is placed nearest the heat source while the most heat wicking is placed nearest the coolant, exploiting best features of both, and suffering only a minor heat transfer penalty for not using the highest heat conductivity throughout. Examples of high strength materials include stainless steel and steel alloys having a substantially higher melting point than copper alloys. Examples of high conductivity materials include copper metal and copper metal alloys.

The layered composite material may comprise more than two material layers, such as three layers or more. FIG. 20B shows an arrangement comprising three material layers: a high strength layer 2150, an intermediate strength and conductivity layer 2160, and a high conductivity layer 2170. Including additional layers of different metals with different combinations of yield strength and thermal conductivity, the material properties versus depth in the wall may be controlled to minimize stresses. For a wall made of a layered material comprising three layers, the high strength material preferably comprises no more than a third of the wall thickness and faces the combustion chamber. The thickness of the high strength layer 2150 is limited to permit a high rate of heat flow from the combustion chamber to the high conductivity layer 2170. The lower thermal expansion coefficient of the high strength layer 2150 produces less thermal compression stress in the layer facing the combustion chamber than a copper alloy. The presence of the intermediate strength and conductivity layer 2160 provides some ability for the layers to slide past each other to relieve some shear stress. Whether two, three, or more layers are present, detailed thermo mechanical analysis is preferably used to inform the selection of materials for the different layers and to what extent the different the layers should be diffusion welded or HIP fusing or otherwise fixated to each other (e.g., brazed) when fabricated.

FIG. 21 illustrates a method for making a layered tube/pipe of different materials at different radial stations to make layering composite materials as shown in FIGS. 20A and B, which then can be formed into a rocket engine shell liner. The process starts similarly to that described for FIGS. 18A and 18B. After the first wrap ending at 1810, or preferably a wrap and a half ending at 1801 about the mandrel roller 1850 using the higher strength material of 2110,2150 for sheet 1800, a sheet 2200 of the high conductivity material 2120 or intermediate layer 2160, if present, either twice as long or twice as thick as the first front side metal 1800 for the 2 layer version is butt welded to the end of the first front side metal sheet along their mutual edge 1899 and 2209. This second sheet is then rolled over the first sheet on the roller 1850, for at least two and preferably 2.5 rotations if the sheet is twice as long and for one (preferably 1.5) rotations if the sheet is twice as thick. While it is rolled onto the mandrel roll 1850, the inner (upper) side of new sheet 2200 is at least being pressure formed if not diffusion welded or HIP fusing to the outer side of the already rolled on sheet 1800 as the sheet is rolled on the tube. The trailing edge of the second sheet 2299 is then fixed via welding, brazing or diffusion welding or HIP fusing to the exposed upper layer the underlying second material along the trailing edge, at least at a 1 wrap completion and preferably with an additional half wrap to ensure the end of the first sheet at 1899 is diametrically opposed from end of the second sheet 2299 for maximum overall strength of the tube/pipe. Ideally, all butt welds between sheets and all leading and trailing edges of sheets all reside at equally spaced angular separations from their neighbors. All leading and trailing edges of sheets are soldered, brazed or otherwise fastened to the layer they adjoin to complete the tube/pipe. The positions of 2110 and 2120 or 2150 and 2170 relative to the combustion chamber and coolant may be reversed for some embodiments.

Although only uniform thicknesses of sheets has been described, the use of non-uniform thickness sheets, potentially in either the axial or even circumferential dimensions may be advantageous. For example, a new sheet of a different thickness from the one before may employ a tapered thickness starting from a thickness equal to the prior sheet's thickness along its leading edge 2209 for a sheet length of about half a circumference of the tube/pipe in order to gradually ramp up to the full thickness of the sheet. Likewise one may use a tapered thickness ending with a very thin thickness over the later trailing length of the last sheet of about half a circumference of the tube/pipe in length, in order to avoid leaving any notable lip on the outer edge of the tube/pipe. The same approach can be used with the front edge of the very first sheet, so there is not lip left on the inside surface of the tube/pipe either.

The thickest of the sheets may also be varied along the tube/pipe axial dimension so as to apply thicker material where needed along the final formed rocket engine shell liner. Such added thickness can compensate for areas where spin forming might otherwise thin out layers. Such added thickness can also help prevent the collapse of cooling channels which might be embedded into the layers as described subsequently. Such axial dimension thickness variation may be achieved by machine pressing as inferred above with respect to edges 2209 and 2299. However, an alternate approach is to simply stack a second sheet of smaller area size atop the sheet to be fed, register its location where added thickness is desired, and thereby essential sandwich the additional desired thickness in between the new outer sheet and the prior rolled sheets on the tube/pipe mandrel. The pressure roller 1950 may be modified to accommodate this varying thickness at different axial stations which may be achieved by replacing 1950 with a roller made of a more compliant material that will somewhat conform to the different thickness versus axial position, or by use of multiple rollers of slightly different diameters, or by a roller with different radii to accommodate the different thicknesses at different axial stations. This affords significant flexibility in the layer profiles available in the resultant tube/pipe.

Although FIGS. 20A and 20B show two or three layers in the cross section of a completed tube/pipe, there is nothing to preclude using more layers or thinner layers in the stack/laminate. More layers permit additional degrees of freedom in selecting different materials with different properties to achieve desired net tube/pipe properties. Formation of a tube/pipe may require annealing some or all the materials in order to manipulate them and form them into a singular tube/pipe, which requires at last some re-hardening and tempering which may require some development and precise process control to accomplish. Coolant channels may be embedded into layered tube/pipe embodiments comprised of sequential sheets of material rolled onto the mandrel. These coolant channels may be coincident with the layers of laminate structures to enable coolant to flow within the tube/pipe wall in the axial direction of the rocket engine's axis.

Figure 22:
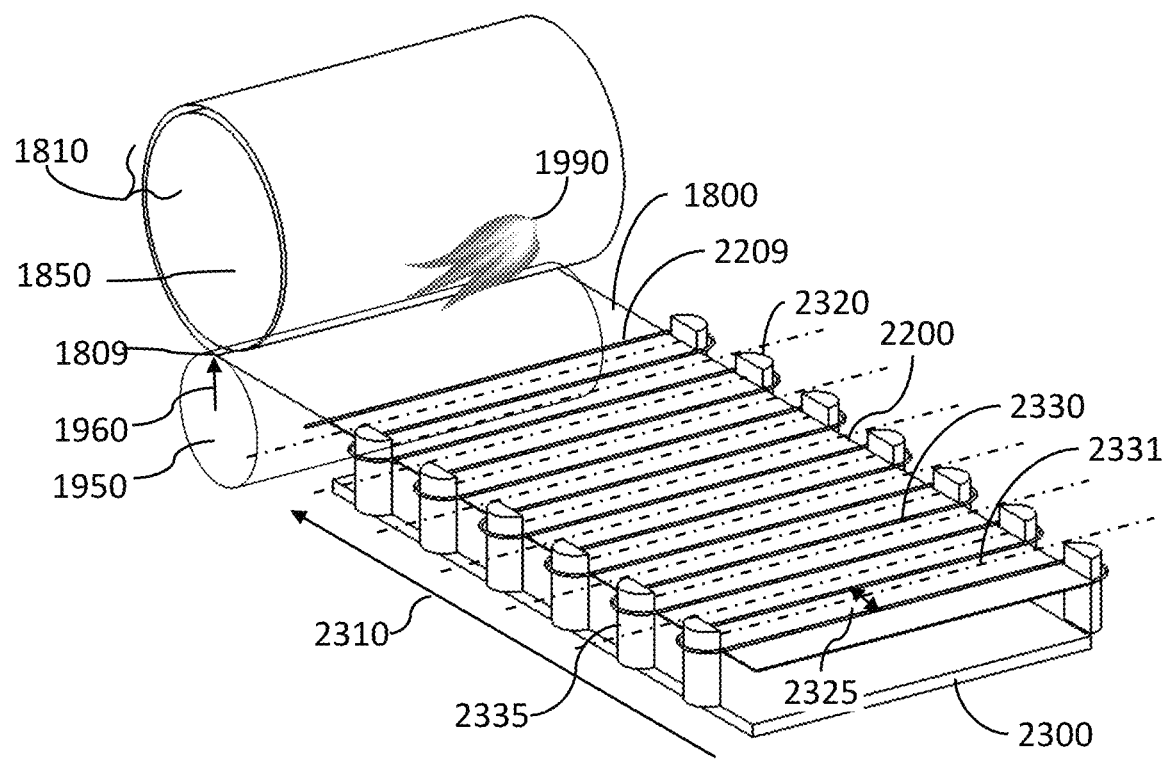
FIG. 22 illustrates creating axial coolant channels by introducing parallels wires spaced by a channel width.

One such embodiment is shown in FIG. 22, wherein a movable rack 2300 supports a metal sheet 2200 fixed edge wise to prior sheet 1800. Rack 2300 translates 2310 towards the roller mandrel 1850 in a controlled manner to retain a tension between the trailing ends of sheets 1800 and 2300 and particularly at the touch/contact point 1809 as the roller mandrel 1850 rolls the sheets onto it. Rake tines 2320 are fixed vertically to rack 2300 and translate with it as sheets 1800 and 2300 are wound onto mandrel 1850. A wire, tube, channel or cable 2330 of suitable diameter to instantiate the depth of the coolant channels, and suitable length to instantiate the lengths of all the coolant channels, is routed cross wise under tension between tines 2320, with the tines disposed on opposite sides of the rack, so as to wind a serpentine path for wire, tube, channel or cable 2330. The spacing between the tines 2320 is selected to make the spacing gap 2325 between the wires, tubes, channels or cables 2330 the desired width of the coolant channels. The wires, tubes, channels or cables 2330 become the walls of the coolant channels, the sheet 2200 becomes the outer side of the coolant channels, and the sheet 1800, after having been wound onto the roller mandrel 1850, comprises the inner side of the coolant channel towards the combustion chamber. A welding pressure 1809 and/or heat 1990 process binds all the wound elements of 1800, 2330, and 2200 together as previously described.

A spacer-filler wire, tube, channel or cable 2331 may optionally be installed between the wires, tubes, channels or cables 2330 to ensure the desired coolant channel between wire, tube, channel or cable 2330 pairs is retained even after rocket engine forming. The spacer-filler wire, tube, channel or cables 2331 extend out past one edge, or the other, of both edges of the sheets 1800 and 2200 so it may be mechanically grasped and pulled out of the roll 1820 by mechanical removal. The spacer-filler 2331 may be comprised of a material which can be later dissolved or melted away. Alternatively, 2331 may be comprised of a very high tensile strength material such as steel cable, kevlar or spectra, optionally with a suitable coating sheath. The coating sheath may comprise a friction reducing material such as teflon or a coating of graphite. The coating sheath covering the spacer-filler 2331 allows the spacer-filler to be pulled easily from the formed rocket engine, leaving a tubular void in its place. Any coating sheath shed in the process of 2331 removal is removed by heat burnout or solvent based pressure cleaning.

The diameter of the wire, tube, channel or cable 2330 and the spacing 2325 between them are not necessarily the depth and width of the coolant channel. The diameter and spacing are chosen such that the desired coolant channel dimensions are achieved after all the processing is completed. For example, the spin forming process may distort the shapes of elements undergoing the spin forming and this must be compensated for ahead of time by the proper dimensions and spacings of these constituent parts.

Figure 23A:
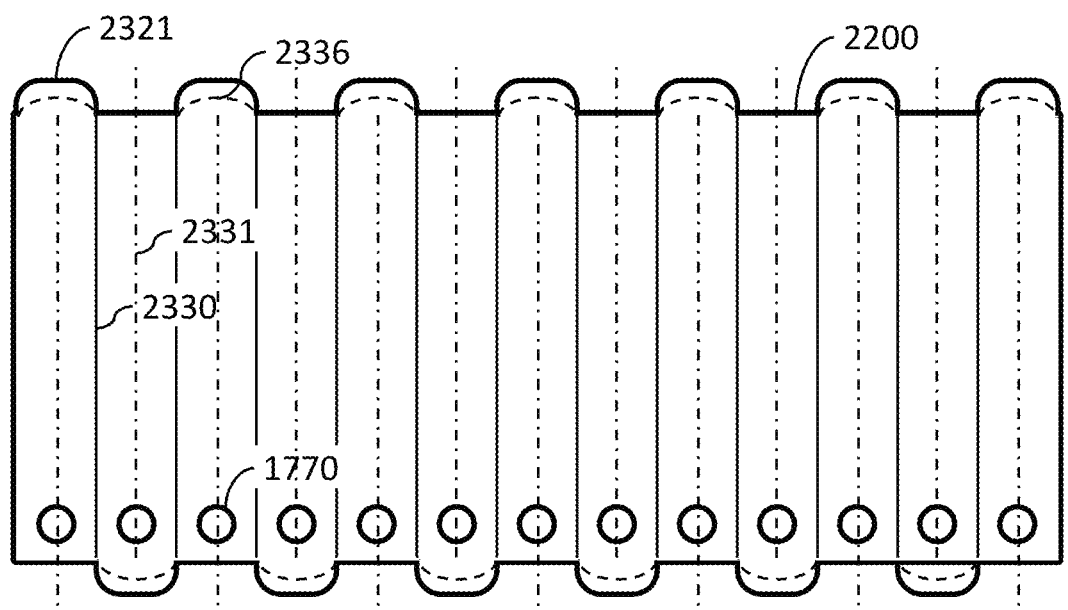
FIG. 23A illustrates creating axial coolant channels by cutting out a sheet with tabs.

In cases where a low tension is found adequate, or if sheet 2200 is sufficiently strong, FIG. 23A shows an alternate means for securing and registering the wire, tube, channel or cable 2330 to the assembly, and to sheet 2200 directly. Sheet 2200 is selected to be slightly oversized in width and tabs 2321 are cut out along the edges of 2200 over which is looped 2336 the wire, tube or cable 2330 with a spacing of 2325. Tabs 2321 take the place of the tines 2320 in FIG. 22. Coolant channel access ports for 1770 may be laser or otherwise cut/drilled into sheet 2200, eliminating the need for a separate drilling or milling operation later in the three dimensional shell liner. By cutting the coolant channel ports into the sheet prior to winding onto the roll, they can be inspected to assure that they will be registered and have direct access to the coolant channels they are to support. This approach can be used for any ports needed into the coolant plenum on any of the associated variants of the invention shown in figures herein.

Figure 23B:
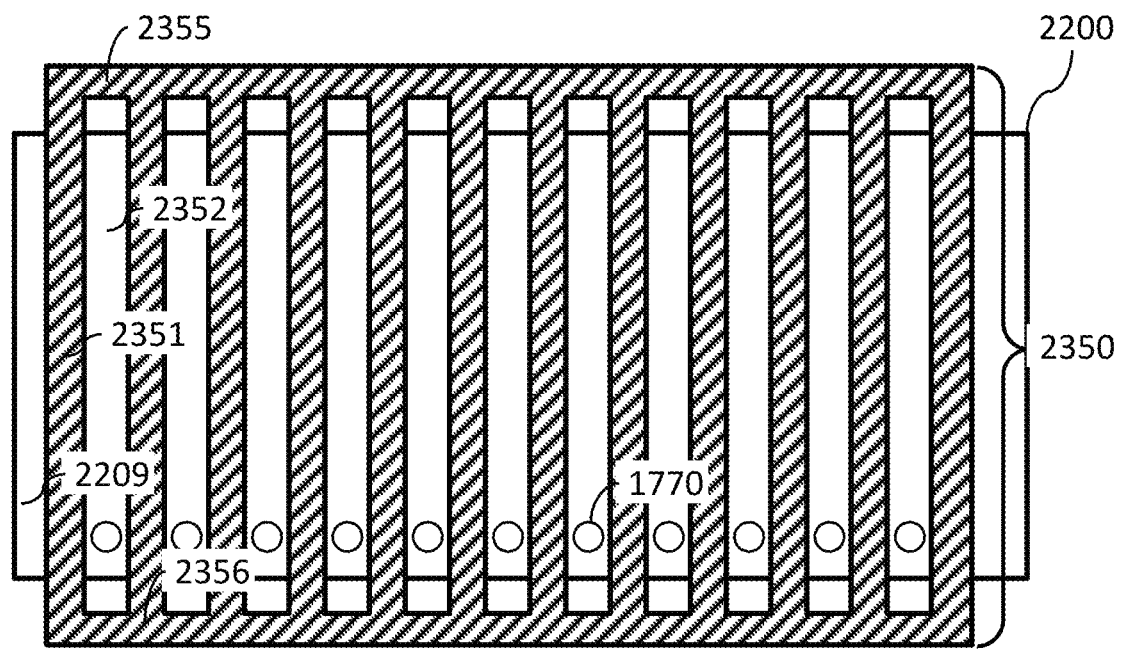
FIG. 23B illustrates an alternate step of creating axial coolant channels in which slots are cut into a sheet of metal to create coolant channel walls.
Figure 23C:
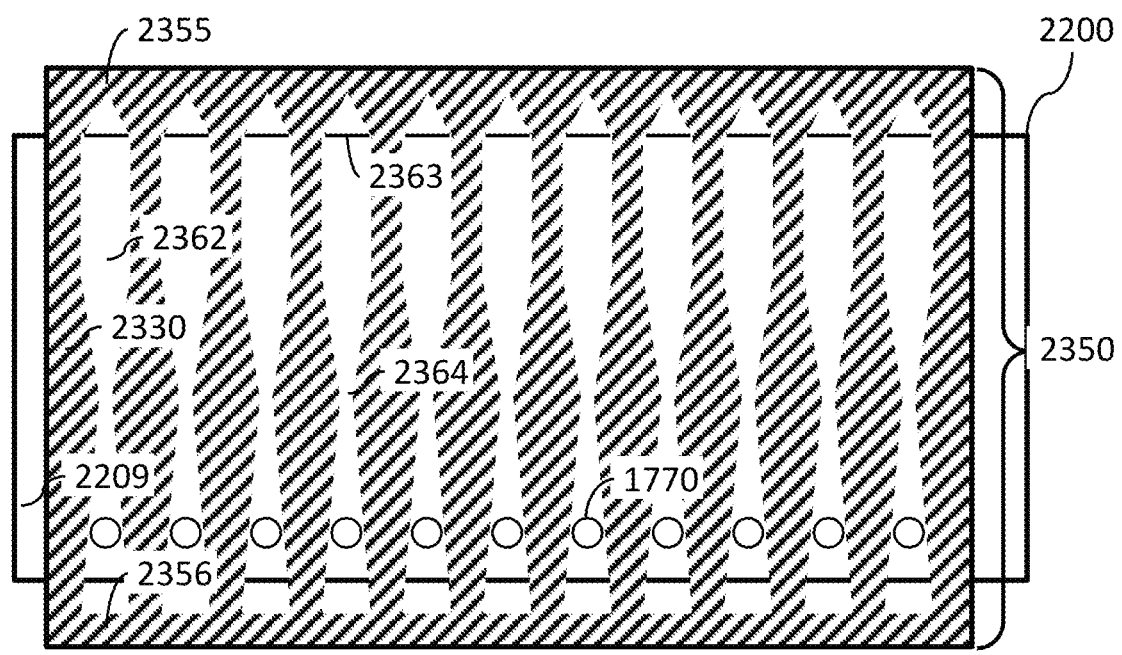
FIG. 23C illustrates varying slot widths to compensate for narrowing that might occur during follow on spin forming or hydro forming.

FIG. 23B shows a further alternate means for creating cooling channels in the rocket engine shell liner. A sheet 2350 made of the material desired for the walls of the coolant channels, and of a thickness commensurate after processing to the desired depth of the coolant channels, is laid atop and registered to the sheet 2200 which will act as the back side of the coolant channels in an analogous manner in which the wire, tube, channel or cable 2330 is used in FIGS. 22 and 23A. Into sheet 2350 is milled, via mechanical, laser, plasma or other cutting means a plurality of identical slots 2352 aligned crossways to the direction of feed 2310, the number of which correspond to the number of coolant channels and with a width after processing that will correspond to the width of the each of the coolant channels. This leaves a plurality of material strips 2351, which after processing will correspond to the coolant channel septum wall thickness. Strips 2351 are held a registered separation distance from each other (i.e. the width of slot 2352) by header 2355 and footer 2356, both also of the same sheet material 2350 and which fasten and register all the strips 2351 for handling and layout. After being rolled onto mandrel 1850, these strips provide the walls to create axial cooling channels with substantially rectilinear cross section. Although the headers 2355 and 2356 are shown exterior to the perimeter of supporting sheet 2200, which may be of benefit for handling and registration, they may also be designed to reside within the perimeter of sheet 2200. In this case they help to prevent the ends of the coolant channels at the edges of the rolled assembly on the roller mandrel 1850 from accidentally being pressed closed by the pressure processing. They are then trimmed off with a lip of the edge as a final step after spin forming to expose the open coolant channels.

Whereas the completed roll 1810 is to be spin formed after completion of all wraps of metal sheets 1800 and 2200, consideration may be given to the impact of the spin forming on the dimensions of the channels at various axial station in the rocket engine shell liners, by pre-distorting the designs to compensate for the distortion before the spin forming. There are electronic computer programs which can predict the distortion caused by different spin forming operations, and by reversing those distortions, the ideal or required shape of the strips 2351 or alternatively 2330 may be determined in advance. Alternatively, one may start with a simple shape, perform all operations on it, dissect and examine the shape it took on, and then iteratively reverse the distortions to obtain a pre-distorted starting shape needed to end up with the desired final shape.

Figure 23D:
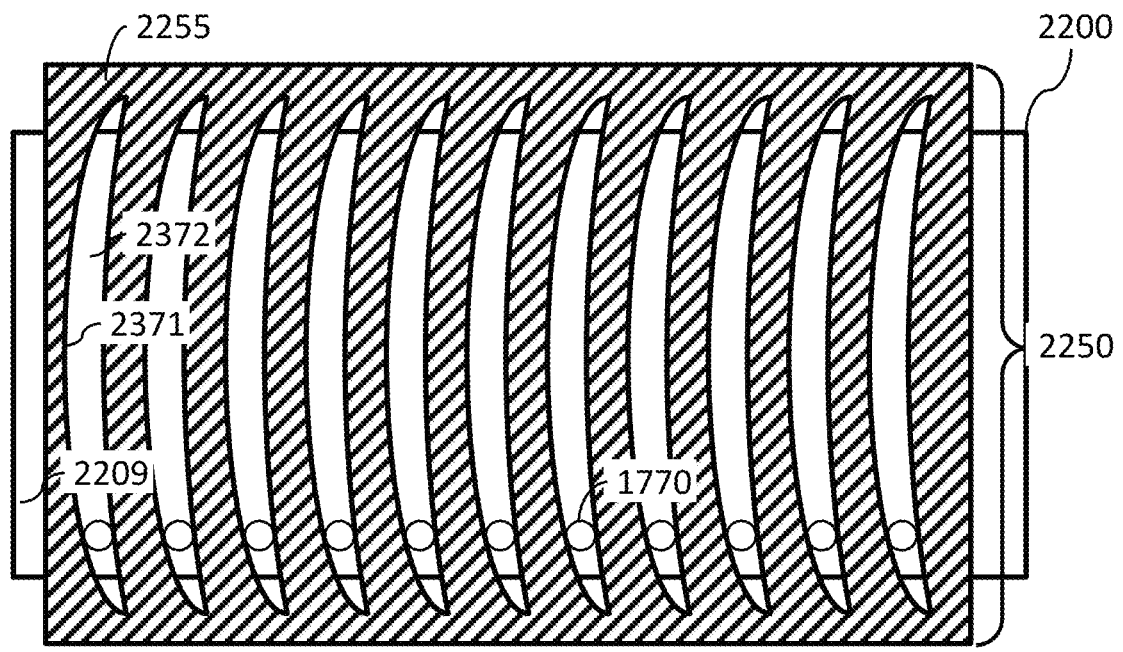
FIG. 23D illustrates pre-distorting slots to compensate for shear migration distortion.

Another type of distortion possible is circumferential migration from the spin forming where the metal is pulled circumferentially during the spin forming process. This can be minimized by spinning in steps and alternating the direction of spin on each step. To the extent that there is a residual circumferential migration of the channel walls, this may be pre-distorted out of the final product by distorting the strips 2371 and associated slots 2372 in an opposite direction to the spin as shown at in FIG. 23D.

Figure 24A:
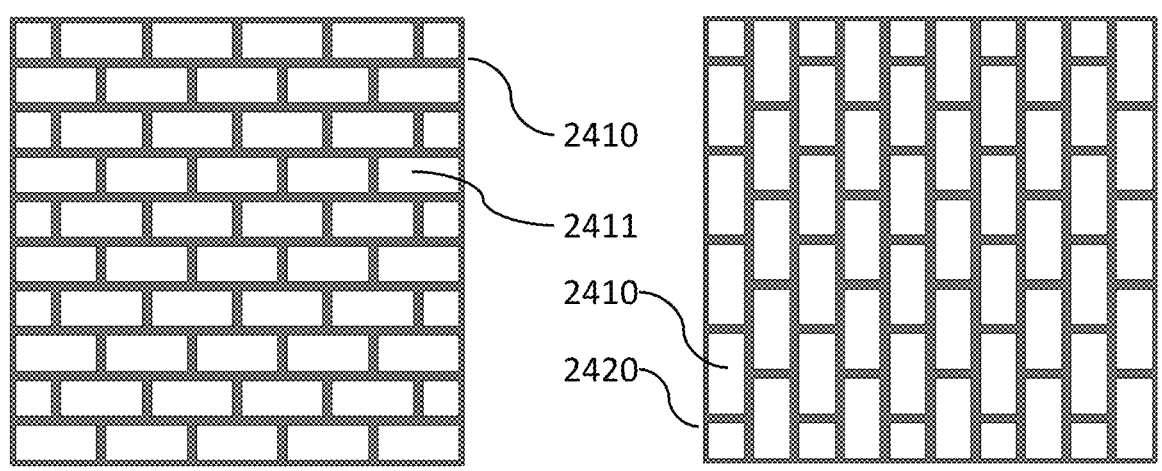
FIGS. 24A and 24B show two exemplary screen sheets with rectangular apertures disposed perpendicularly to each other.

Another approach to providing cooling channels involves cutting apertures into interstitial sheets between 1800 and follow on sheets 2200 of specific shapes, sizes and registered locations to allow coolant to flow through the wall after rolling these sheets atop each other with suitable location registration, pressure bonding, brazing, welding and/or diffusion welding or HIP fusing as deemed appropriate. A first aperture sheet 2410 (FIG. 24A) is milled by laser cutting or other means to manifest a plurality of regular closely spaced apertures 2411 with a longer aperture dimension disposed horizontally. Similarly, a second aperture sheet 2420 is milled by laser cutting or other means to manifest a plurality of regularly closely spaced apertures 2421 with a longer aperture dimension disposed vertically. The alignment of the longer aperture dimensions may deviate from the horizontal and vertical, respectively, as long as their alignments are orthogonal to each other, with diagonal orientations preferred.

Figure 24B:
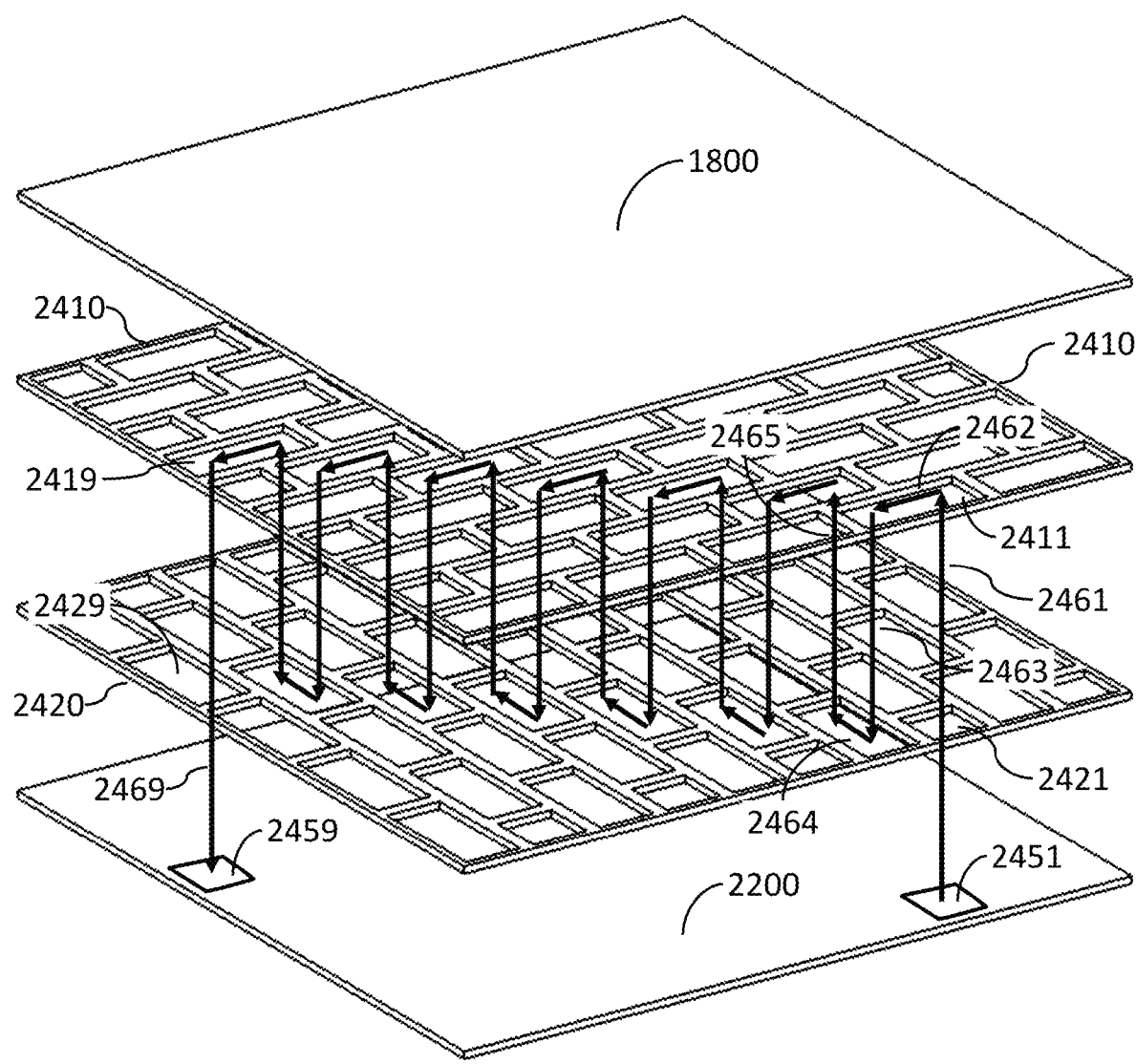

By laying sheet 2410 atop sheet 2420 or vice versa, and bonding sheets 2410,2420 together, their overlapping apertures form a contiguous network of overlapping edge connected apertures which provide fluid channels along the interior of the wall comprising the first and second sheet which are further closed with an adjoining top solid sheet 1800 and adjoining bottom solid sheet 2200 as shown in FIG. 24B. By way of example, an entry aperture (fluid port) 2451 is cut in solid sheet 2200 much like described for 1770 and is used to admit coolant from an external coolant supply manifold (not shown) into the network of connected apertures following the arrows in FIG. 24B. Coolant first passes through aperture 2421 in aperture sheet 2420 and then into aperture 2411 of adjacent aperture sheet 2410. Coolant then flows along the longer dimension 2462 of aperture 2411 until it encounters an overlapping aperture 2463 down to aperture sheet 2420, which then carries the fluid in a perpendicular direction 2464, until it encounters an overlapping aperture path 2465 back up into aperture sheet 2410, and so on. Upon encountering a last aperture 2419 on the edge of the sheet 2410, the coolant finds a path 2469 through aperture 2429 in aperture sheet 2420 which connects to exit aperture 2459 in solid exterior sheet 2200, and into a coolant exit manifold (not shown) or the injector head assembly. The fluid follows a substantially diagonal path with respect to the rectilinear layout of the rectangular apertures, which is why the preferred layout of apertures is diagonal with respect to the axial direction.

Precise registration between the perforated aperture sheets 2410 and 2420 is not necessary because leakage into adjacent diagonal paths is compensated by leakage from neighboring diagonal paths on the other side of the leakage. All that is required is that each aperture overlap with at least one of its neighboring, orthogonally oriented apertures in the other adjacent sheet, and that the webbing between apertures is not wide enough to prevent coolant flow between any aperture and its corresponding mates on the other sheet.

Figure 24C:
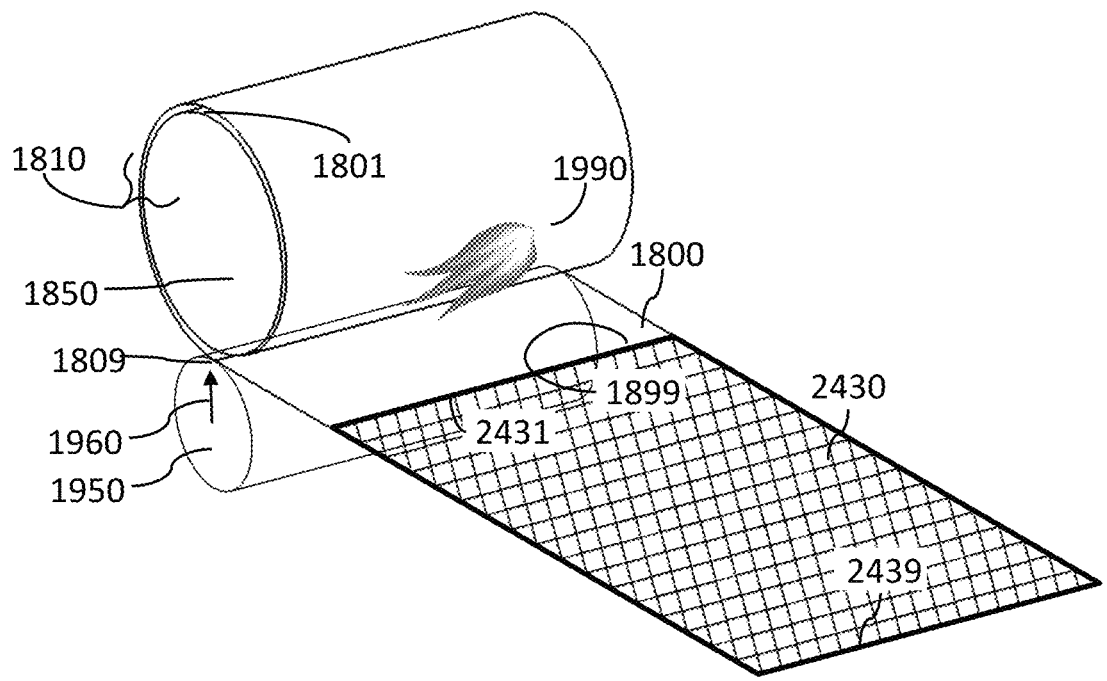
FIG. 24C shows a step of using a woven wire mesh screen to provide flow between wires of the mesh, with the mesh disposed with the mech diagonal axis aligned with the rocket engine axis.

An alternate method replaces perforated aperture sheets 2410 and 2420 with a singular sheet of woven wire mesh 2430 as shown in FIG. 24C for constructing tube 1810. The woven wire mesh is oriented to provide a best flow after forming into the rocket nozzle shape, with corner tips of the mesh square aligned with the tube axis to form a diamond shape with respect to it. The method results in the woven wire mesh being layered between solid sheet layers 1800 and 2200 like layers 2410 and 2420 are layered inside of 1800 and 2200 in FIG. 24B. FIG. 24C shows the woven wire mesh 2430 oriented diagonally with respect to the axis of the tube 1810 so that when the tube is formed into the nozzle shape, the woven wire mesh collapses diagonally along the tube and the nozzle throat circumference by elongating diagonally and contracting laterally to conform to the narrower nozzle throat diameter. The specific weave type dictates the best orientation to achieve mechanical malleability for nozzle forming while also maximizing flow laterally/tangentially through the woven wire mesh in the desired coolant flow direction.

The woven wire mesh 2430 may be selected from a variety of specific weave types such as a plain, square, twilled, 4-bonded, 5-bonded, EGLA 5, satin twilled, double intermediate crimp screen, type C, lock scrimp screen, type D, flat top screen, type E, pressure welded screen, type F, and Dutch weaves and combinations of these. Additionally, the woven wire mesh 2430 may comprise a multiplicity of woven wire mesh sheets of same or different mesh sizes, opening sizes, wire gauges, and wire materials layer laminated atop each other in a prescribed order. Coolant flow through a maze of apertures as shown in FIGS. 24A-D is not as free as with the rectilinear straight channels of FIGS. 23A-D and the flow has a higher head pressure for a given flow rate. However, the coolant flow has a higher turbulence which improves heat transfer to the coolant from the hot solid sheet 1800 in use.

Once the wires, tubes, channels or cables 2330 and/or strips 2350 and or perforated aperture sheets 2410 and 2420 or woven wire mesh 2430 and sheet 2200 are laid up on rack 2300 and sheet 2200 is fixed to sheet 1800 along its edge 2209, the assembly is drawn forward 2310 towards the roller mandrel 1850 and rolled slowly under tension onto the roll.

During the rolling process pressure is applied between roller 1850 and roller 1950 and optionally heat 1990 is applied to pressure form and/or sinter and/or diffusion weld the layers together at the contact point 1809. The pressure and temperature combination is regulated to ensure that the wires, tubes, channels or cables 2330 are not excessively flattened or damage or pierce the sheets 2200 or 1800.

Figure 24D:
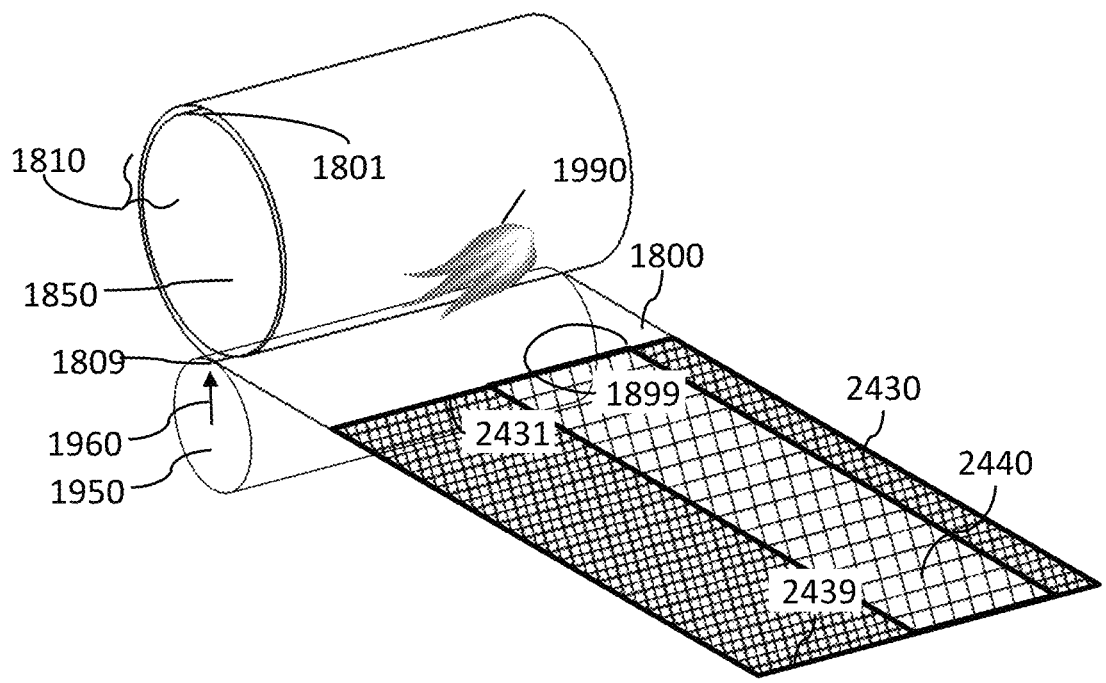
FIG. 24D shows the step of using different materials at different locations in the material layup.

Different parts of a rocket engine may require different material properties and materials at different locations, particularly at different axial stations, but also possibly at points of plumbing and instrumentation attachment areas. The methods described herein provide unique combinations of materials and properties. FIG. 24D illustrates one embodiment of a method that customizes local properties further. The woven wire mesh sheet 2430 comprises one or more subdivided subordinate sheets or strips 2440. Subordinate sheets or strips 2440 may comprise a coarse mesh so that, when it is collapsed into the throat of the nozzle by the forming process, there are gaps sized for the coolant fluid to flow. Subordinate sheets or strips 2440 may be woven into the wire mesh sheet 2430 or can replace an equivalently sized area of 2430 with 2440 or may be lapped and laid atop or below 2430. Subordinate sheet or strip 2440 may be larger or smaller than its gap in 2430 and lapped over or under it along is meeting edges. By this means, different properties and materials may be integrated at different axial stations along the rocket engine to provide improved strength, coolant flow, or other characteristics important to the rocket engine operation, reliability and lifespan.

Figure 25A:
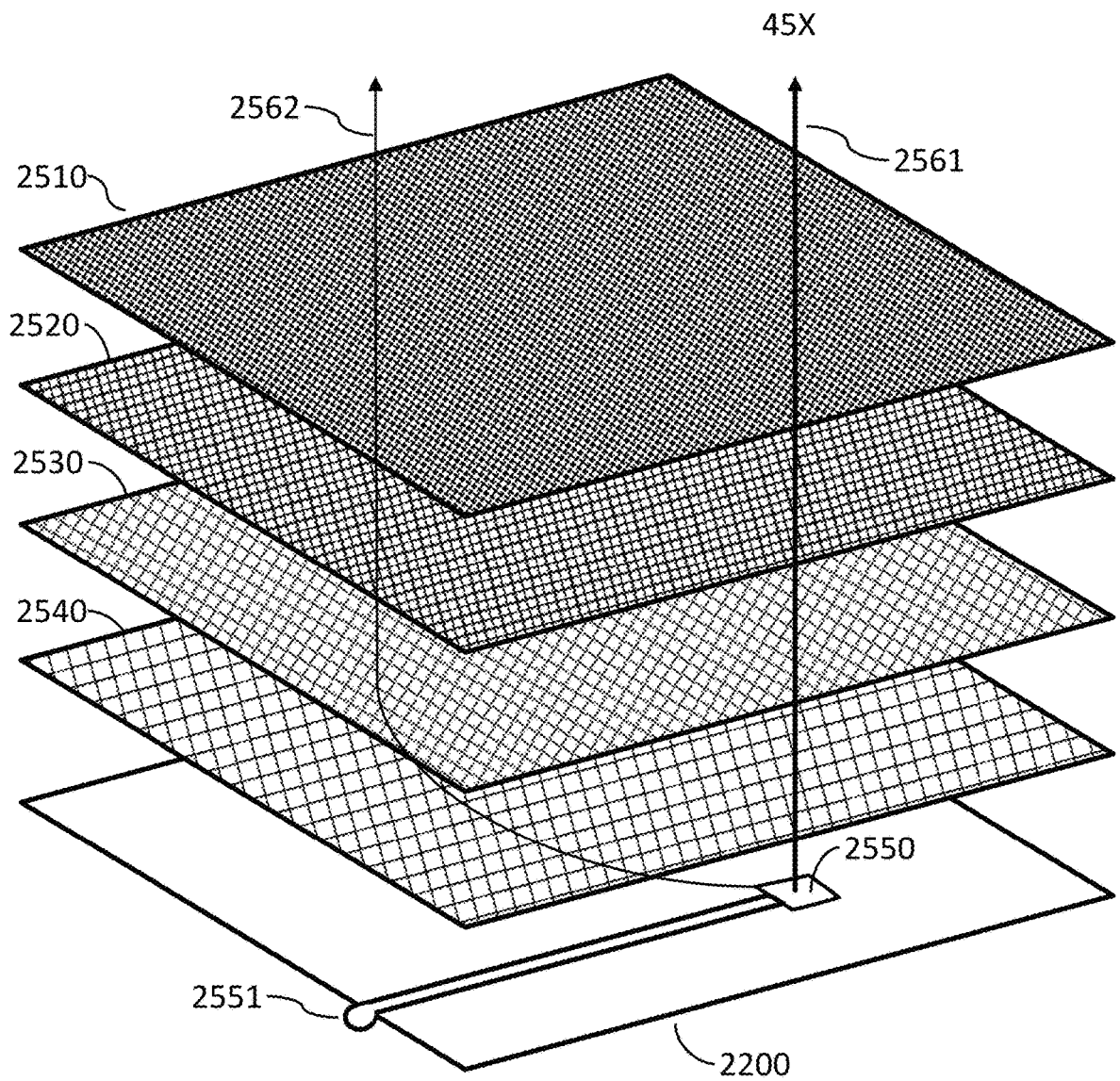
FIG. 25A shows a stack of progressively finer woven wire mesh screens from the outer side to the inner side and an aperture for feeding coolant to the inside surface of a combustion chamber and nozzle.

FIG. 25A shows a different embodiment of a layered structure for facilitating coolant flow. In this embodiment, resultant coolant flow is perpendicular to the shell liner surface, predominantly out from the inner surface of the rocket engine, thereby providing a superior laminar flow and film cooling. The embodiment comprises a solid closeout sheet 2200 followed by a stack of sheets 2540, 2530, 2520, 2510, each with progressively finer mesh sizes with the finest mesh eventually facing the rocket inner volume 45X where "X" represents any one of 450-455 in FIG. 4. A plurality of apertures 2550 are cut into the solid closeout sheet 2200 at lateral separations to support a desired flow rate of coolant 2561 and 2562 into the rocket engine inner volumes 45X to effect film and transpirational cooling. In use, some of the coolant flows directly out from the stack of mesh grid sheets 2540, 2530, 2520, and 2510 directly, as indicated by 2561, while the balance of coolant flow diverts to other lateral locations more remote from apertures 2550 to achieve a uniform laminar flow rate of similarly temperate coolant flow perpendicular to the shell liner 2200, thereby establishing an isolating boundary layer to protect the wall from heat loading from combustion gases inside the chamber volume 45X. The inner most layer 2540 provides lateral channels (not shown) to help in the uniform lateral distribution of the coolant from the apertures 2550 to the uniform laminar flow into the chamber volume 45X.

The plurality of apertures 2550 are fed by a tubular manifold (not shown) exterior to (below) 2200 and/or a coolant plenum 480 exterior to 2200 in a multi-shell liner design. The stack of sheets 2540, 2530, 2520, 2510 with progressively smaller mesh sizes operates like an electric gas welder "gas lens" which creates uniform and laminar flow for welding, but here a similar arrangement is providing very uniform and laminar flow for film cooling the shell liner of the rocket engine to include the stack of sheets 2540, 2530, 2520, 2510, plus the coolant plenum exterior to 2200. This arrangement is similar to an aerator pad used in dry material handling to promote material flow through tank drain orifices. In this way, any axial station on the rocket engine employing this stack becomes an aerator of coolant. The coolant flows through the thickness of the rocket engine shell liner and into the rocket engine chamber and interior, isolating the hot gasses inside the rocket engine burn volume from the surface of the shell liner. This provides both conductive and convective flow cooling of the shell liner before the coolant is either expelled in a film about the inner circumference of the engine or consumed as a propellant.

Figure 25B:
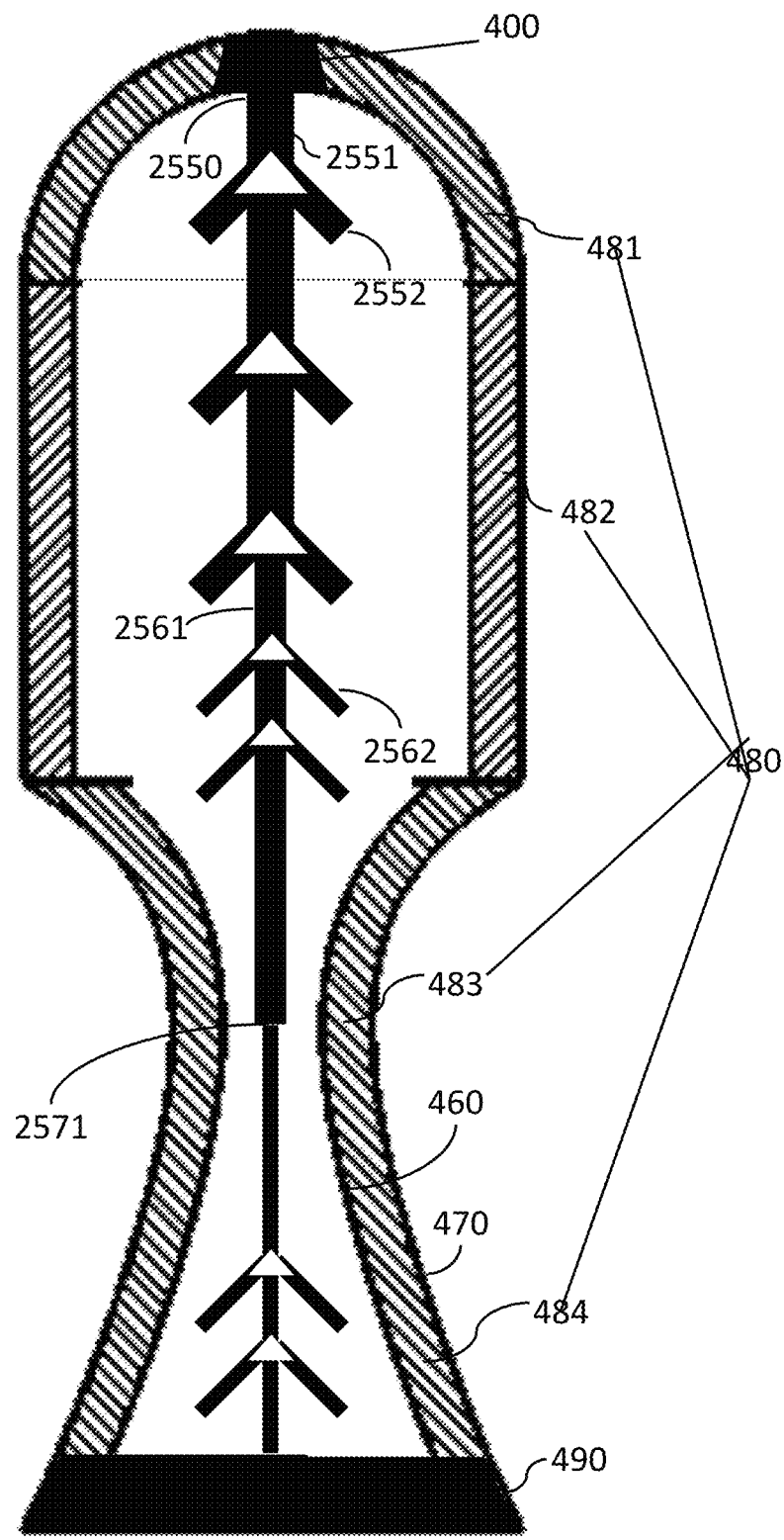
FIG. 25B is a side cross-sectional view of a rocket engine comprising a bifurcating network of channels in a stack of progressively finer woven wire mesh screens.

Closeout sheet 2200 may comprise impressed channels 2551 to help distribute coolant across the area. These may be employed in a one dimensional "snake" or two dimensional "tree" arrangement across an area serviced by each aperture 2550 to distribute coolant evenly per unit area. A plurality of such apertures 2550 may be provided near the top of the engine chamber near the injector head 400 as shown for one such aperture 2550 in FIG. 25B, optionally fed by and/or from the injector head 400 with a singular main "trunk" impressed channel 2551 about the top region of the top of the combustion chamber. The impressed channels 2550 run axially down the side of the chamber wall to distribute coolant down along substantially the entire length of the chamber with the channels 2550 constricting along the length e.g. at 2561 and 2571 to provide even coolant distribution along the length of the engine. The channels 2550 also comprise subordinate branching channels 2552 to divert coolant circumferentially from each impressed channel 2551 and likewise smaller branches 2562 and 2572 from the smaller channels 2561 and 2571, respectively, to achieve uniform coolant distribution over the entire interior face area of the combustion chamber wall inner shell liner 460.

Diffusion welding is a preferred method of fixation for most of the parts in FIGS. 23A-D and 24A-D. An alternative is to apply a high temperature brazing paste, such as a gold alloy, to the assembly when laid up on the rack, or to apply high temperature brazing paste to parts thereof (such as the wires, tubes, channels or cables 2330 and/or strips 2350), and/or perforated aperture sheets 2410 and 2420 or woven wire mesh 2430 before entering the roller presses 1850 and 1950, and then performing a furnace brazing of the entire assembly after being rolled onto roller mandrel 1850 to fixate all the coolant channels.

An alternate method for fixating the assembly particularly applicable to an embodiment as shown in FIG. 25A is to perform electrodeposition of alloys onto the multiple mesh layup from the inside of the rocket engine. Such electrodeposition is often used to close out a grooved coolant channel rocket engine core. Electrodeposition is preferably performed after the shell liner has been formed into the desired rocket engine shape. A same or similar process applied to the multiple mesh layup described for FIG. 25A serves to weld the meshes together into a strong yet porous matrix from which to support the desired film and transpiration cooling without the violent environment of the engine causing deformation or damage to the matrix.

A stack of outer layer 2200 wires, tubes, channels or cables 2330, and/or strips 2350 and/or perforated aperture sheets 2410 and 2420 or woven wire mesh 2430 and inner layer 1800 may be laid up all at once on the movable rack and then fed into roller mandrel at once. The disadvantage of this approach is that it lacks the sheet overlapping advantage described for 1801 and 1809, but there are likely advantages to each approach for different specific situations and requirements.

Figure 26:
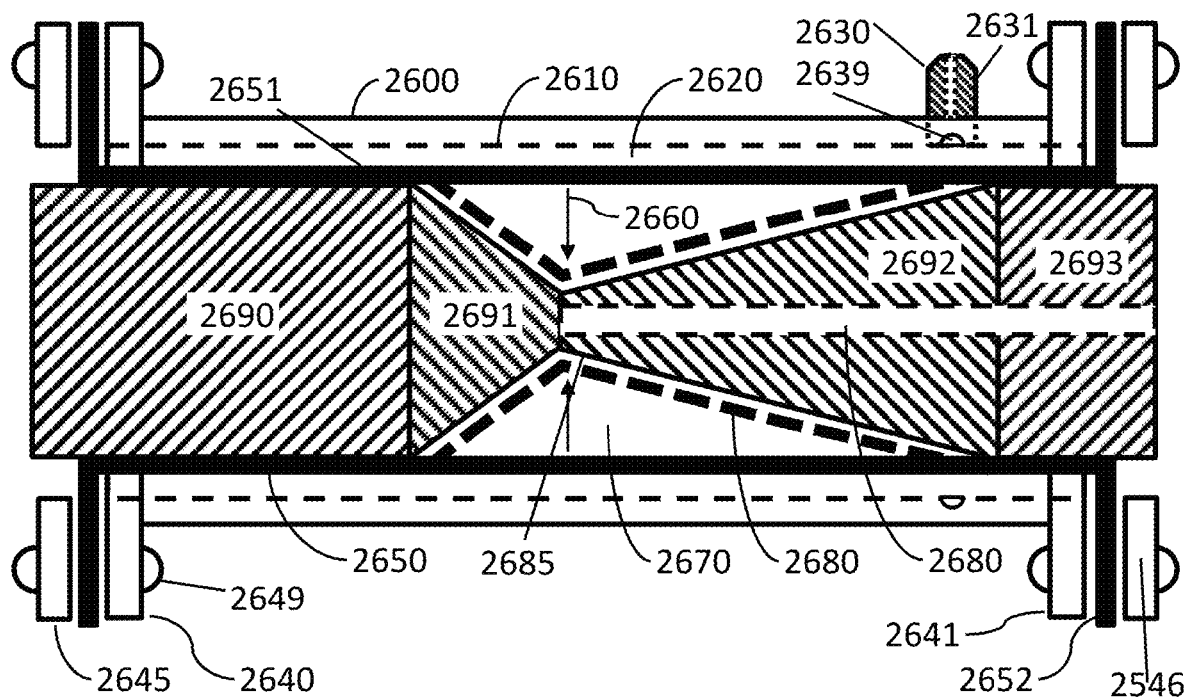
FIG. 26 is a side cross-sectional view showing a configuration and hydro forming process to form a tube/pipe into a rocket engine shell liner.

Spin forming is a preferred method of forming the final rocket engine but there are other fabrication techniques which may be used and may be preferable depending on specifics of design and materials. One alternative to spin forming is hydro forming which uses high pressure (usually air, water or oil) and often also a mandrel to form parts. FIG. 26 shows an embodiment for hydro forming the rocket engine from the tube/pipe which will make up the rocket shell liner. This may be the separate inner shell liner 460 tube 601 or outer shell liner 470 tube 1101 or a singular composite shell liner 1810 with or without the integral cooling plenum. In either case, the tube for hydro forming comprises some excess length on each end for flange forming.

In FIG. 26 the hydro forming apparatus comprises a pressure rated hydro forming tube 2600 shown in axial cross section with an inner surface 2610 large enough to encompass annealed rocket engine tube 2650,1810, allowing a small but non-zero clearance 2620 through which hydrofluid may pass. Pressure tube 2600 has pressure rated annular flanges 2640 and 2641 on both ends of the tube 2600. The rocket tube 2650 has flanges 2651 initially and 2652 subsequently formed on its ends such that part of the length of tube 2650 needed for the flange 2651 and 2652 is excess to the rocket engine proper and will be wastage. Holes (not shown) are drilled through the flange 2651 and 2652 to pass an annularly disposed plurality of bolts 2649 when mounted. Flanged rocket tube 2650 is inserted into pressure tube 2600 and the second flange 2652 is formed on the other end. Flanges 2651 and 2652 may be formed by plunger press forming or other means. Pressure tube 2600 may comprise two half tubes that clamp together and are hoop tensioned together to form the pressure tube piece.

Annular pressure rings 2645 and 2646 are mounted atop the flanges 2651 and 2652, respectively, and each is secured annularly with annually disposed bolts 2649. This forms a non-zero clearance, which is also a hydro forming tight volume 2620, through which no hydro fluid may pass. Only high pressure threaded nipple 2630 has access to hydro tight volume 2620 through a small injection channel 2631, which feeds a concave ring channel 2639 in the inner side 2610 of pressure tube 2600. The concave ring channel enables the hydro fluid to be subsequently injected in through the injection channel 2631 to flow evenly in the annular direction through channel 2639 so as to apply even pressure annually onto the rocket engine tube 2650. This promotes a radially uniform collapsing of the nozzle without azimuthal asymmetries.

With the pressure tube, flanges and rocket engine tube mounted and sealed, the rocket engine inner contour above throat mandrils 2690 corresponding to the combustion chamber and 2691 corresponding to the chamber constriction and fabricated as one piece with 2690, and inner contour below throat mandrils 2692 corresponding to the combustion nozzle and 2693 corresponding to the Nozzle Exit and fabricated as one piece with 2692 are inserted into the openings of tube 2650 and secured from movement. Mandrils 2692 and 2693 have one or more radial channels cut in their mating faces 2685 (not shown) to promote the escape of compressing air from void 2670 into air escape channel 2680, which vents to the atmosphere when the hydro forming process is performed.

With the system set up and fixated, hydro fluid is slowly injected under pressure into the injector channel 2631, flowing into distribution channel 2639 and into hydro tight volume 2620. As more fluid is pumped into the injection channel, compressive pressure 2660 exerts an inward radial force along the whole axis of the nozzle section of the rocket which is not supported by any of the mandrils 2690, 2691, 2692 and 2693.

Due to the slightly higher hydro pressure near the hydro fluid inlet channel 2639, the rocket nozzle collapses from the end of the nozzle bell forward, eventually collapsing the tube 2650 onto the mandrils to end with the objective nozzle shape 2680 collapsed into void 2670 with air displaced out channels 2685 to the atmosphere through venting tube 2680. Heat may be applied at strategic locations to induce the forming to proceed as desired. Heat may be applied by embedded heating strips or induction heating or flame heating. Mechanical inducement may also be required and the apparatus could support, for example, strategically placed internal bladders connected to the same of other hydro fluid source in order to promote forming as desired.

Once the hydro forming operation is completed, the mandrils, retention flange rings, and at least one of the flanges 2651 or 2652 are removed in order to free the rocket engine shell liner from the hydro former. A hydro formed rocket engine may be produced without the annular migration of internal coolant channel structures that may occur with spin forming.

A further alternate method for effecting the required rocket engine chamber and nozzle forming is herein referred to as "tensioned line winding forming," or "winding forming." and can be accomplished with less equipment, in principle requiring only a lathe or rotator with a gear reducer and a line which can undergo high tensioning.

Figure 27:
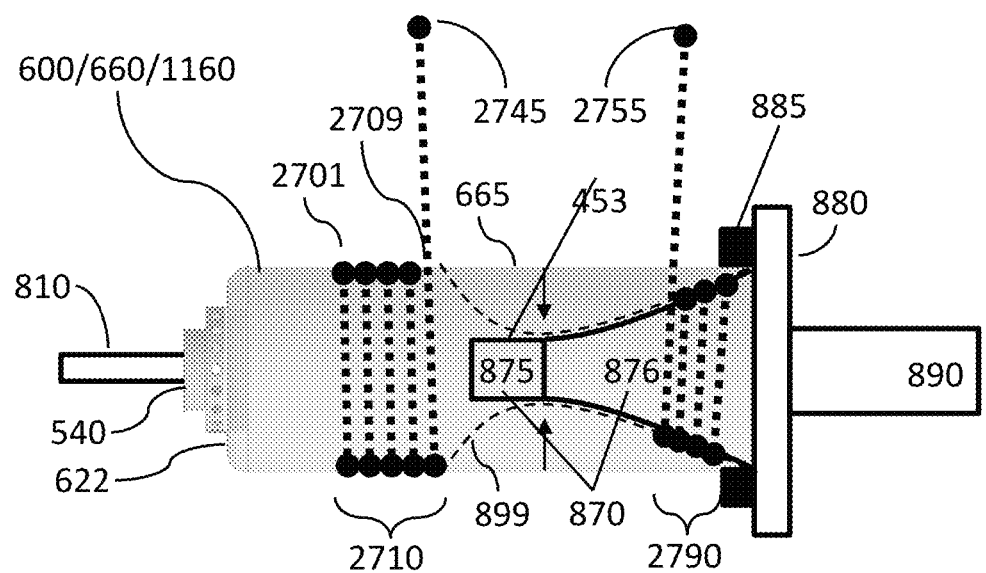
FIG. 27 illustrates a configuration and process for progressive tension line forming to form a tube/pipe into a rocket engine shell liner.

FIG. 27 shows a winding forming process wherein at least one line 2710 is secured tangentially to the tube 600/660/1160 at a point 2701 distant to the desired start 2709 of the formed curvature. For a nozzle hourglass shell shape, a second line 2790 may be positioned axially opposite the throat 453 to the first, so that the two lines bracket the axial beginning and ending of the nozzle 430/440. This also applies to a tapered combustion chamber 420, which may be geometrically considered the start of the nozzle if it has a cone angle inward towards the throat. The lines may be made of materials such as nylon that stretch under tension or materials such as steel cable that do not.

Tension is applied to lines 2745 and 2755 for one or more starting wraps. FIG. 27 shows starting wraps near 2710 and 2790, which are preferred to give the line a good friction hold of the outer side of the tube rather than relying on the attachment point of the line to the tube. The tube is turned on the lathe or rotator with the lines kept at a prescribed tension tangentially to the tube and also with some tension in the axial direction toward prior wraps so as to pack subsequent wraps tightly against the prior wraps. Although the two lines 2710 and 2790 are shown wrapping in the same chiral direction, the two lines may be wrapped oppositely to provide more balanced pull loading on the mandrel, but one or both must orbit the tube 600/660/1160 with the tube being fixed rather than rotating about its axis. FIG. 27 shows both lines being tensioned from the same side of the tube axis, which doubles the lateral loading on the lathe and rotational fixture. It is preferable that the two line tensioners at 2710 and 2790 are disposed 180 degrees opposite each other to reduce lateral loading, leaving mostly torsional loading on the tube 600/660/1160 and the supporting lathe or rotator and fixtures 810 and 890.

As additional wraps are applied inwards towards the throat 453, the prior wraps apply a inward radially directed force which adds with the radially directed force of prior wraps to additively accumulate a larger inward radial force than any one wrap. This progressively collapses the tube 600/660/1160 onto the mandrel 870 until it rests upon the mandrel, resulting in a planned counter 899 providing the desired nozzle shell body of revolution. This process may require intermediate annealing to ensure the tube does not work harden. A dual conic mandrel more similar to 2691 and 2692 may be required to instantiate the winding forming process.

The winding forming process may also be employed for the ends of the tube to create inward directed flanges as described for FIGS. 7 and 10, but it may be more difficult to keep the line from sliding off the forming flange lip. For this reason, such curved shell shapes are preferably formed by spin forming or a combination of the winding forming and spin forming to start and finish the flange bends respectively.

Figure 28:
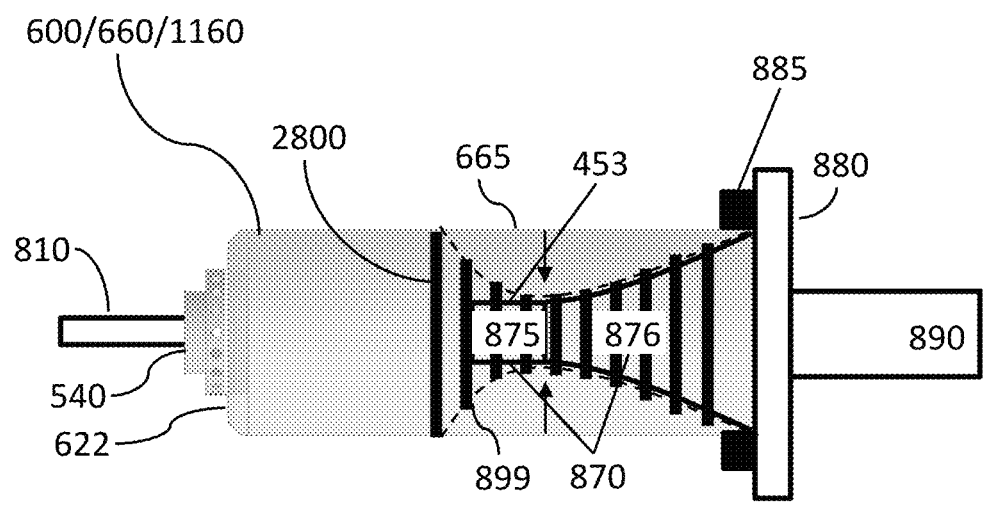
FIG. 28 illustrates a configuration and process for progressive tension band forming to form a tube/pipe into a rocket engine shell liner.

In lieu of wraps provided by a singular line or a plurality of lines, the same process and results may be obtained by applying a plurality of individual tensioning bands 2800 along the tube where it is desired to reduce the radius, particularly along the nozzle as shown in FIG. 28. The smaller diameters are obtained by sequentially tightening the bands 2800 in a progressing order from axial stations distal to the throat towards the throat until the inner most bands at the throat have constricted in diameter and circumference at the throat, and the tube has been shaped to the shape of the nozzle. This process may require intermediate annealing to ensure the tube does not work harden. This process may take longer than line tension winding but requires fewer tools. The tensioning bands 2800 may remain on the rocket engine or replaced by other tensioning bands or a retainer shell.

The invention claimed is:

1. A method for manufacturing a liquid fueled rocket engine, said method comprising:
    forming a first flange in apposition to a top end of a first tube comprising a first metal alloy to form a first flanged tube;
    fixing an injector head to the first flange to form an inner shell liner assembly;
    shaping the first flanged tube of the inner shell liner assembly;
    forming a second flange in apposition to a top end of a second tube comprising a second metal alloy to form a second flanged tube;
    positioning the inner shell assembly inside the second flanged tube and fixing the second flange to the injector head to form an outer shell liner assembly; and
    shaping the second flanged tube of the outer shell liner assembly
    wherein:
    said shaping the first flanged tube comprises applying external pressure to outer surfaces of the first flanged tube to reduce a circumference of the first flanged tube at said outer surfaces and
    said shaping the second flanged tube comprises applying external pressure to outer surfaces of the second flanged tube to reduce a circumference of the second flanged tube at said outer surfaces.

2. The method of claim 1, wherein said shaping the first flanged tube of the inner shell liner assembly forms walls of a combustion chamber, a throat, and a nozzle of the rocket engine.

3. The method of claim 1, wherein said applying external pressure to outer surfaces of the first flanged tube and said applying external pressure to outer surfaces of the first flanged tube involves a spin forming process, a hydro forming process, a winding forming process, or any combination of these.

4. The method of claim 1, wherein said forming a first flange and said forming a second flange involves a spin forming process, a hydro forming process, a winding forming process, or any combination of these.

5. The method of claim 1, wherein the injector head comprises a first injector flange and wherein fixing the first injector flange to the first flange closes out a top portion of a combustion chamber of the rocket engine.

6. The method of claim 1, wherein the injector head provides a mounting flange and comprises a mounting point for mounting the inner shell assembly into a spin forming machine after the injector head has been fixed to the first flange.

7. The method of claim 1, wherein said shaping the first flanged tube and said shaping the second flanged tube results in a gap between said inner shell liner and said outer shell liner of the rocket engine.

8. The method of claim 1, further comprising applying standoff tabs onto outer surfaces of the inner shell liner assembly before positioning the inner shell assembly inside the second flanged tube.

9. The method of claim 1, further comprising encircling the inner shell liner assembly with a multiplicity of azimuthally distributed, axially aligned, metal spacer rods, tubes, channels or metal cables before positioning the inner shell liner assembly inside the second flanged tube.

10. The method of claim 1, further comprising fixing an end cap ring to bottom ends of the first and second flanged tubes after said shaping the second flanged tube to hold the bottom ends together.

11. The method of claim 10, wherein the end cap comprises a first groove and a second groove and wherein the method further comprises forming a flange at the bottom of each of the first flanged tube and the second flanged tube and wherein the first groove and second groove are configured to receive the flanges at the bottom of each of the first flanged tube and the second flanged tube, respectively.

* * * * *